US009390201B2

(12) United States Patent
Rameau et al.

(10) Patent No.: US 9,390,201 B2
(45) Date of Patent: Jul. 12, 2016

(54) MERGING OF MODELED OBJECTS

(75) Inventors: Jean-Francois Rameau, Lisses (FR); Thomas Doumenc, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 279 days.

(21) Appl. No.: 13/324,768

(22) Filed: Dec. 13, 2011

(65) Prior Publication Data

US 2012/0316841 A1    Dec. 13, 2012

(30) Foreign Application Priority Data

Dec. 30, 2010    (EP) .................................... 10306542

(51) Int. Cl.
*G06F 17/00*    (2006.01)
*G06F 17/50*    (2006.01)
*G06T 17/00*    (2006.01)

(52) U.S. Cl.
CPC .............. *G06F 17/50* (2013.01); *G06T 17/005* (2013.01); *G06F 2217/04* (2013.01)

(58) Field of Classification Search
CPC ..... G09G 5/377; G09G 5/14; G09G 2340/10; G06F 17/30941; G06F 17/50; G06F 2217/04; G06F 17/30; G06F 12/00; G06F 9/44; G06T 7/0065; G06T 17/10; G06T 19/20; G06T 2219/2021
USPC ........................................................ 345/629
See application file for complete search history.

(56) References Cited

U.S. PATENT DOCUMENTS

| 5,850,535 | A | 12/1998 | Maystrovsky et al. |
| 6,341,291 | B1 | 1/2002 | Bentley et al. |
| 7,079,114 | B1 | 7/2006 | Smith et al. |
| 7,313,504 | B2 | 12/2007 | Chin et al. |
| 7,755,621 | B2 | 7/2010 | Kripac |
| 7,913,190 | B2 | 3/2011 | Grimaud et al. |
| 8,248,407 | B2 | 8/2012 | Deslandes |

(Continued)

FOREIGN PATENT DOCUMENTS

| EP | 1501026 A1 | 1/2005 |
| EP | 2028623 A1 | 2/2009 |
| WO | WO 2008/127254 A1 | 10/2008 |

OTHER PUBLICATIONS

Wiemann, Helge. "Theory of Graph Transformations." (1995), http://www.informatik.uni-bremen.de/st/lehre/Arte-fakt/Seminar/Ausarbeitungen/04_Theorie_Graphtransformationen.pdf.*

(Continued)

*Primary Examiner* — Mark Zimmerman
*Assistant Examiner* — Sarah Le
(74) *Attorney, Agent, or Firm* — Hamilton, Brook, Smith & Reynolds, P.C.

(57) ABSTRACT

A computer-implemented method for merging a first and second modeled object which are modified versions of an initial modeled object and are defined by a first and second graphs. The method comprises merging the first graph and the second graph. For this, the method comprises computing a first rewriting rule and a second rewriting rule corresponding respectively to a transformation of an initial graph into the first graph and the second graph, determining a third rewriting rule by assembling the first rewriting rule and the second rewriting rule, and computing a merged graph by applying the third rewriting rule to the initial graph. Such a method is an improvement for the merging of modeled objects.

13 Claims, 16 Drawing Sheets

(56) References Cited

U.S. PATENT DOCUMENTS

| | | | |
|---|---|---|---|
| 8,305,376 B2 | 11/2012 | Ran et al. |
| 8,429,174 B2 | 4/2013 | Ramani et al. |
| 8,983,804 B2 | 3/2015 | Houdouin et al. |
| 8,983,805 B2 | 3/2015 | Rameau et al. |
| 2003/0085889 A1 | 5/2003 | Chin et al. |
| 2007/0291028 A1 | 12/2007 | Kripac |
| 2008/0140732 A1 | 6/2008 | Wilson et al. |
| 2008/0255809 A1 | 10/2008 | Ran et al. |
| 2008/0309678 A1 | 12/2008 | Reghetti et al. |
| 2010/0274818 A1 | 10/2010 | Chauvin et al. |
| 2012/0109589 A1 | 5/2012 | Thompson et al. |
| 2012/0109591 A1 | 5/2012 | Thompson et al. |
| 2012/0173208 A1 | 7/2012 | Houdouin et al. |
| 2012/0173212 A1 | 7/2012 | Rameau et al. |
| 2012/0316841 A1 | 12/2012 | Rameau et al. |
| 2013/0311450 A1 | 11/2013 | Ramani et al. |

OTHER PUBLICATIONS

European Search Report for European Application No. EP 10306542 dated May 25, 2011.
Sadeghi, M. et al., "Support for effective change management in product data management systems," Paper presented at Computers and Industrial Engineering, 2009, International Conference on IEEE, Piscataway, NJ, pp. 1514-1519 (Jul. 6, 2009).
Yan, S., et al., "An asynchronous CAD collaborative design model", Paper presented at Computer Application and System Modeling (ICCASM), 2010 International Conference on IEEE, Piscataway, NJ, pp. V6-563-V6-566 (Oct. 22, 2010).
Ebrahim, Batgheri, et al., "An exploratory classification of applications in the realm of collaborative modeling and design," *Information Systems and E-Business Management*, 8(3):257-286 (Nov. 15, 2008).
European Search Report for European Patent Application EP 10306544 dated Jun. 21, 2011.
Schmidt, R., et al., "Interactive implicit modeling with hierarchical spatial caching," *Fibres and Optical Passive Components*, 2005, pp. 104-113 (Jun. 13, 2005).
Pariente, F., et al., "Incremental and localized update of convex decomposition used for form feature recognition," *Computer Aided Design*, 28(8):589-602 (Aug. 1, 1996).
European Search Report for European Application EP 10306543 dated May 27, 2011.
Kahl, W., el al., "Amalgamating Pushout and Pullback Graph Transformation in Collagories," *Lecture Notes in Computer Science*, vol. 6372, pp. 362-378 (2010).
Jahnke, J.H., et al., "A case study in Supporting Schema Evolution of Complex Engineering Information Systems," Paper presented at the meeting of Computer Software and Applications Conference, 1998, COMPSAC'98 Proceedings, The Twenty-Second Annual International Vienna, pp. 513-520 (Aug. 19, 1998).
Rodden, et al., "A Survey of CSCW Systems", *Interacting with Computers*, 3(3):319-353 (Dec. 1, 1999).
Nan, Niu, et al., "A Category-theoretic Approach to Syntactic Software Merging", Paper presented at the meeting of Software Maintenance, 21st IEEE International Conference on Sep. 25-30, 2005, Piscataway, NJ, pp. 197-206 (Sep. 25, 2005).

Cheung, Gary K. L., et al., "Incremental Rendering of Deformable Trimmed NURBS Surfaces," Paper presented at the meeting of Proceedings of the ACM Symposium on Virtual Reality Software and Technology, pp. 48-55 (Jan. 1, 2003-Mar. 10, 2003).
Woerdenweber, B., "Surface Triangulation for Picture Production," *IEEE Computer Graphics and Applications*, 3(8):45-51 (Nov. 1, 1983).
Guo, B. et al., "Local Shape Control for Free-form Solids in Exact CSG Representation," *Computer Aided Design*, 28(6):483-493 (Jun. 7, 1996).
Hsu, C., et al., "A Constraint-Based Manipulator Toolset for Editing 3D Objects," Paper presented at meeting on Proceedings of the Fourth Symposium on Solid Modeling and Applications Atlanta, GA, Symp(4):168-180 (May 14, 1997).
Sohrt, W., et al., "Interaction with Constraints in 3D Modeling," Paper presented at meeting on Symposium on Solid Modeling Foundations and CAD/CAM Applications, pp. 387-396, (Jun. 5, 1991).
Tilove, R.B., "A Null-Object Detection Algorithm for Constructive Solid Geometry," Communication of the ACM, 27(7):684-694 (Jul. 1984).
Mens, T., "On the Use of Graph Transformations for Model Refactoring," University of Mons-Hainaut, Belgium, *Lecture Notes in Computer Science*, 2006, vol. 4143, Generative and Transformational Techniques in Software Engineering 2005, pp. 219-257 (2006).
Diskin, Z. et al., "Scenario Integration via Higher-Order Graphs," Technical Report No. 2006-517, Queens University, Kingston, Ontario, Canada (2006).
Cazals, F., et al., "Reporting Maximal Cliques: New Insight into an Old Problem," INRIA research report No. 5615, France (Jan. 2007).
Laako, T., et al., "Feature Models for Design and Manufacturing," 23rd Annual Hawaii International Conference on System Sciences Proceedings, 2: 445-454 (Jan. 2-5, 1990).
Mens T., "A Formal Foundation for Object-Oriented Software Evolution," pp. 1-4 (2001).
Brunet, G., et al., "A Manifesto for Model Merging," *International Workshop on Global Integrated Model Management Proceedings*, pp. 5-11 (2006).
West, S., and Kahl, W., "A Generic Graph Transformation, Visualisation, and Editing Framework in Haskell," *ECEASST*, pp. 1-18 (2009).
Rho, J., and Wu, C., "An Efficient Version Model of Software Diagrams," *Asia-Pacific Conference on Software Engineering*, pp. 236-243 (1998).
Godfrey, M., and Zou, L., "Using Origin Analysis to Detect Merging and Splitting of Source Code Entities," *IEEE Trans. on Software Engineering*, 31(2): 166-181 (2005).
Wolfram Kahl, "Co-tabulations, Bicolimits and Van-Kampen Squares in Collagories", 2010, vol. 29: Graph Transformation and Visual Modeling Techniques, pp. 1-15.
Anand and Kahl, Code graph transformations for verifiable generation of SIMD-parallel assembly code, 2008, Applications of Graph Transformations with Industrial Relevance Lecture Notes in Computer Science vol. 5088, pp. 217-232.
Kahl, Rcfactoring heterogeneous relation algebras around ordered categories and converse, 2004, Journal on Relational Methods in Computer Science, vol. 1, pp. 277-313.
Drewes et al., Shaped Generic Graph Transformation, 2008, Applications of Graph Transformations with Industrial Relevance Lecture Notes in Computer Science vol. 5088, pp. 201-216.

\* cited by examiner

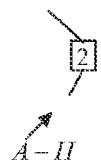
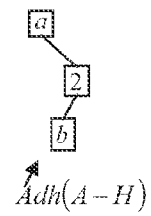
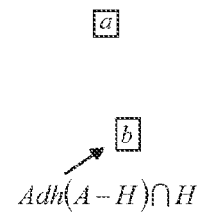
FIG. 3   FIG. 4   FIG. 5
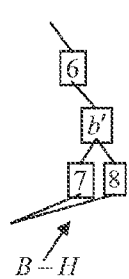
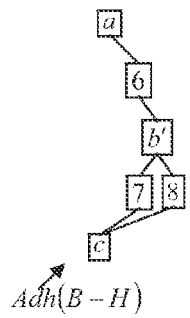
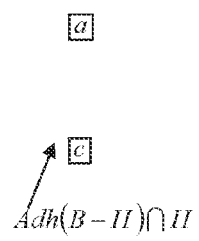
FIG. 6   FIG. 7   FIG. 8
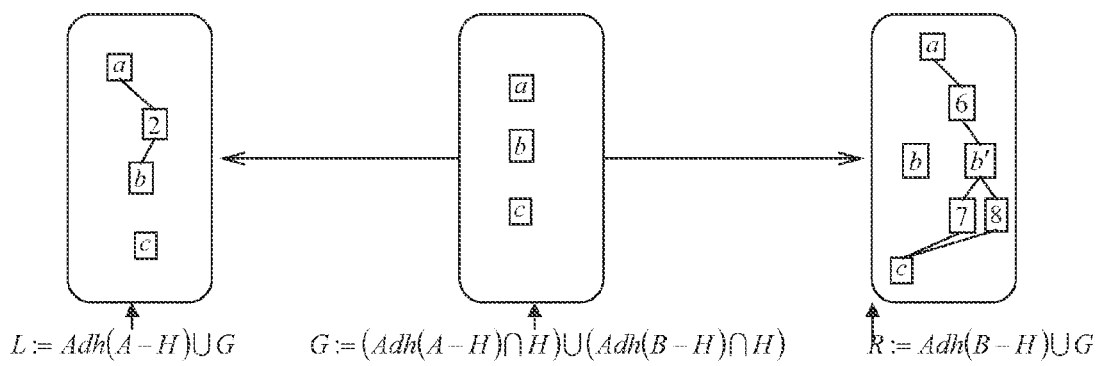
FIG. 9

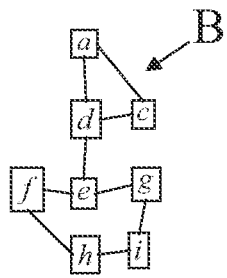
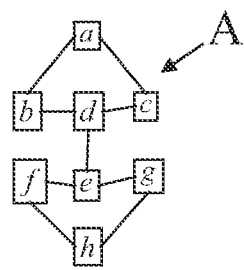
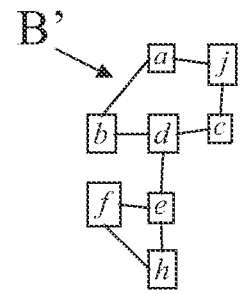
FIG. 21    FIG. 22    FIG. 23
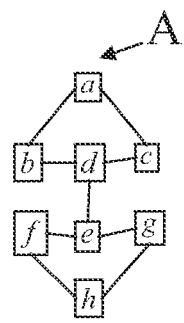
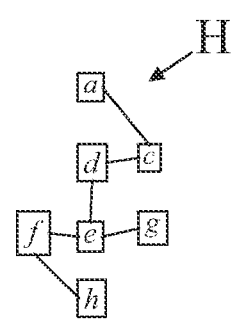
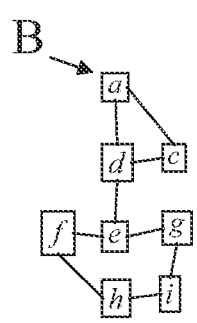
FIG. 24    FIG. 25    FIG. 26
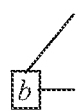
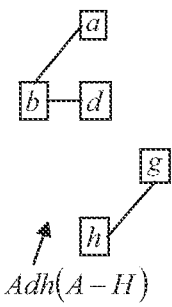
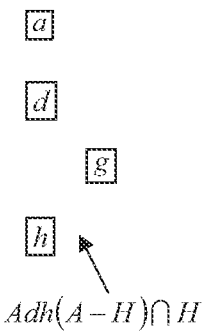
$A-H$    $Adh(A-H)$    $Adh(A-H) \cap H$
FIG. 27    FIG. 28    FIG. 29

$B-H$ $Adh(B-H)$ $Adh(B-H) \cap H$ $L := Adh(A-H) \cup G$ $G := (Adh(A-H) \cap H) \cup (Adh(B-H) \cap H)$ $R := Adh(B-H) \cup G$

A

H'

B'

 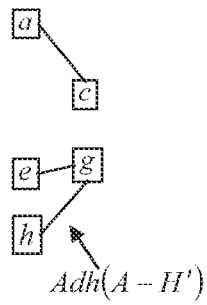 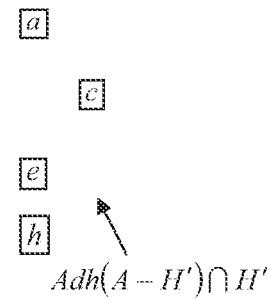
FIG. 39  FIG. 40  FIG. 41
 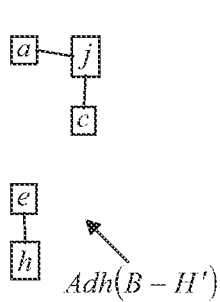 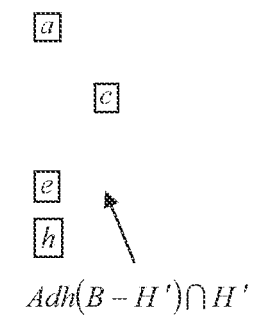
FIG. 42  FIG. 43  FIG. 44
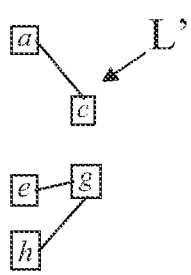 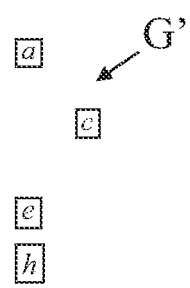 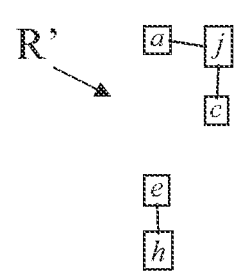
FIG. 45  FIG. 46  FIG. 47

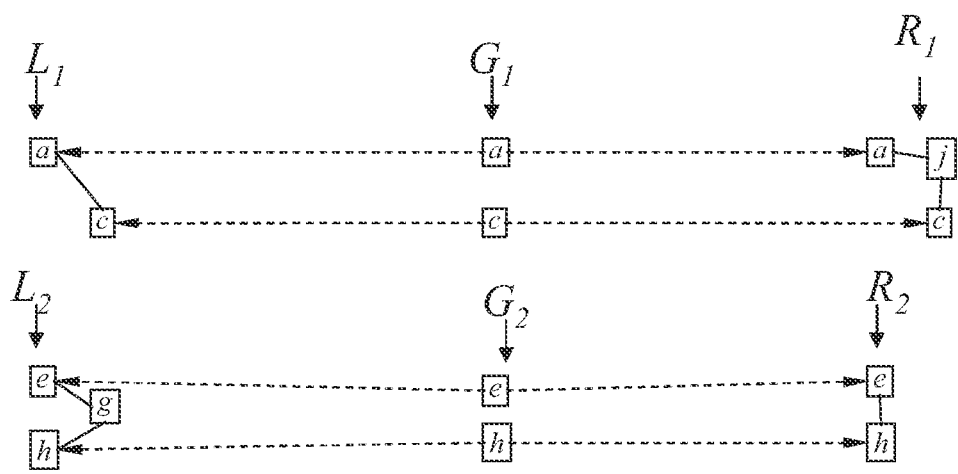
FIG. 51
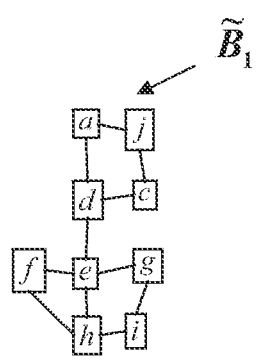  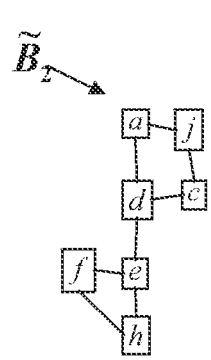  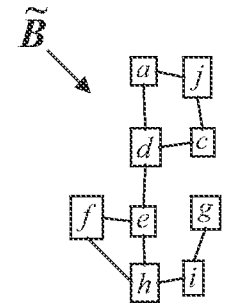
FIG. 52  FIG. 53  FIG. 54

MERGING OF MODELED OBJECTS

RELATED APPLICATION(S)

This application claims priority under 35 U.S.C. §119 or 365 to European Application No. 10306542.1, filed Dec. 30, 2010.

The entire teachings of the above application(s) are incorporated herein by reference.

FIELD OF THE INVENTION

The invention relates to the field of computer programs and systems, and more specifically to a method, system and program for merging a first modeled object with a second modeled object.

BACKGROUND

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systemes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly typically comprising thousands of parts. A CAD system manages models of objects, which are stored in electronic files.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). The digital product may be first defined and simulated using an appropriate application. Then, the lean digital manufacturing processes may be defined and modeled.

The PLM solutions provided by Dassault Systemes (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way. This is known as the field of collaborative design of virtual complex product. "Collaborative design" means that at least two users modify concurrently a common product. "Virtual complex product" means that the product being designed is modeled by an abstract data structure stored in a computer memory and that this data structure includes typed objects linked by typed relationships.

Industrial collaborative design is two folded: "instant collaboration" and "concurrent engineering". On one hand, instant collaborative design is for designers within a small team (approximately two to ten people) to collaborate about a new product. They work in a "brainstorm" mood and each member of the team has to exchange, integrate and modify rapidly new ideas sent by other designers. On the other hand, concurrent engineering involves hundreds of designers working on a complex product through a well defined process. This process manages data ownership, data read and write access. The product is partitioned in such a way that designers can only modify a predefined subset of the whole product, on which they have read and write access. For this purpose, the boundary interface of each designer's working domain is clearly identified so that interaction with other designs is under control.

Academic research addresses the problem of merging two graphs (also called "views" or "models" or "schemas") given the fact that they possibly share a common sub-graph. These graphs are an abstract and partial translation of an application world. The problem is easily solved by the push-out operation of category theory. Rewriting rules are modeled by "single push-outs" or "partial morphisms". They are used a priori to define operations on graphs preserving the application semantic.

The article entitled "On the use of graph transformation for model refactoring" by T. Mens, of the University of Mons-Hainaut, in Belgium, relates to model refactoring, and shows how graph transformation can provide formal support for this activity. The article entitled "Scenario integration via higher-order graphs", in Technical report No. 2006-517, by Z. Diskin, J. Dingel, H. Liang, from Queen's University, in Kingston, Ontario, Canada, 2006, also presents the use of graph theory for the management of scenarios involving models.

The thesis entitled "A relation-algebraic approach to graph structure transformation", by W. Kahl, from University of Munich, in Germany, 2002, includes a statement about "the categoric approach to graph transformation". It explains basic categorical push-out and pull-back operations as well as the "double push-out" graph rewriting.

The article entitled "Finding maximal cliques: new insight into an old problem" by F. Cazals, C. Karande, in INRIA research report No 5615, France, January 2007, provides a complete bibliography of the "maximal clique enumeration algorithm". This algorithm is useful to provide conflict free partial solutions.

Some prior art relates to merging two graphs sharing a common sub-graph. This approach fails to identify elements concurrently modified by two users. The fact that an element a of the initial graph is replaced by an element b in a first modified graph and by an element b' in a second modified graph is not captured. There is no place for this information because element a is not shared by modified graphs. Consequently, a conflict of this kind is out of reach. Furthermore, using single push-out rewriting rules or partial morphism rewriting rules fails to identify the invariant part of the rewriting process, which allows conflict checking. Obviously, this is a consequence of the restricted model (two graphs sharing a common sub-graph) since concurrently overwritten elements are totally missed.

Despite they can freely exchange information, instant collaborative designers have to merge by hand the features sent by other team members. One prior art application is based on declarative solid modeling and deals with mechanical part design.

Concurrent engineering designers own a predefined subset of the product. They may not modify the product elsewhere. When a distant change is necessary, a local try is possible (by duplicating distant data into the working domain), but the actual change is made by the data owner. Consequently, a heavy "conflict solving" process is required through mails, calls or even negotiation meetings so that the design change is well understood.

Thus, there still exists a need for an improved way of merging a first modeled object with a second modeled object.

SUMMARY OF THE INVENTION

According to one aspect, the invention therefore provides a method for merging a first modeled object with a second modeled object. The first and second modeled objects are modified versions of an initial modeled object. The method comprises merging a first graph and a second graph. The first graph and the second graph define respectively the first and second modeled objects. For this, the method comprises computing a first rewriting rule and a second rewriting rule. The first rewriting rule and the second rewriting rule correspond respectively to a transformation of an initial graph into the first graph and the second graph. The initial graph defines the initial object. The first rewriting rule specifies a first part from the initial graph which is to be replaced when transforming the initial graph into the first graph, a first replacement to replace the first part, a first interface between the first part and the first replacement, first morphisms from the first interface to the first part and to the first replacement respectively. The second rewriting rule specifies a second part from the initial graph which is to be replaced when transforming the initial graph into the second graph, a second replacement to replace the second part, a second interface between the second part and the second replacement, second morphisms from the second interface to the second part and to the second replacement respectively. The method further comprises determining a third rewriting rule by assembling the first rewriting rule and the second rewriting rule. The third rewriting rule specifies an assembled part which is an assembly of the first part and the second part, an assembled replacement which is an assembly of the first replacement and the second replacement, an assembled interface which is an assembly of the first interface and the second interface, assembled morphisms from the assembled interface to the assembled part and the assembled replacement respectively. The method also comprises computing a merged graph by applying the third rewriting rule to the initial graph.

In embodiments, the method may comprise one or more of the following features:

the computing of the first rewriting rule and the second rewriting rule comprises determining a first common part between the initial graph and the first graph, and a second common part between the initial graph and the second graph. The computing also comprises determining a first subtraction between the first graph and the first common part, a second subtraction between the second graph and the second common part, a third subtraction between the initial graph and the first common part, and a fourth subtraction between the initial graph and the second common part. The computing further comprises determining first end nodes which are nodes of the first common part missing from arcs of the first subtraction, second end nodes which are nodes of the second common part missing from arcs of the second subtraction, third end nodes which are nodes of the first common part missing from arcs of the third subtraction, and fourth end nodes which are nodes of the second common part missing from arcs of the fourth subtraction. The computing further comprises computing the first interface as a union between the first end nodes and the third end nodes, the second interface as a union between the second end nodes and the fourth end nodes, the first part as a union between the first interface, the third subtraction, and the third end nodes, the second part as a union between the second interface, the fourth subtraction, and the fourth end nodes, the first replacement as a union between the first interface, the first subtraction, and the first end nodes, and the second replacement as a union between the second interface, the second subtraction, and the second end nodes;

applying the third rewriting rule to the initial graph consists of replacing in the initial graph the assembled part by the assembled replacement;

the determining of the third rewriting rule is performed according to a prior evaluation of compatibility between the first rewriting rule and the second rewriting rule;

the evaluation of compatibility comprises comparing a part intersection between the first part and the second part to an interface intersection between the first interface and the second interface, the evaluation being negative when the part intersection is not equal to the interface intersection;

the evaluation of compatibility is negative, and the determining of the third rewriting rule is performed via user interaction;

the determining of the third rewriting rule comprises decomposing: the first rewriting rule into first connected components, wherein each first connected component gathers elements of the first part, the first interface and the first replacement, which are all connected through the first morphisms, the second rewriting rule into second connected components, wherein each second connected component gathers elements of the second part, the second interface and the second replacement, which are all connected through the second morphisms; computing maximal cliques comprised of a first set of first connected components and a second set of second connected components, wherein the intersection between elements of the first set coming from the first part and elements of the second set coming from the second part is equal to the intersection between elements of the first set coming from the first interface and elements of the second set coming from the second interface; and allowing for user selection of at least one of the cliques, the selected clique constituting the third rewriting rule;

the method further comprises, after the user selection of a clique, highlighting on the initial modeled object the elements of the selected clique coming from the first part and from the second part, and obtaining a confirmation by the user of the selected clique;

the first modeled object, the second modeled object and the initial modeled object are three-dimensional modeled objects;

the merged graph is translated in a merged modeled object;

the merged modeled object is displayed;

the first object is provided by a first user performing a first modification on the initial modeled object, and the second modeled object is provided by a second user performing a second design modification on the initial modeled object which is different from the first design modification.

According to another aspect, the invention further proposes a computer-aided design system comprising a memory suitable for storing a first modeled object, a second modeled object, an initial modeled object, a first graph and a second graph defining respectively the first and second modeled objects, and a graphical user interface coupled with a processor and the memory, the graphical user interface being suitable for performing the above method.

According to another aspect, the invention further proposes a computer program comprising instructions for execution by a computer, the instructions comprising means for performing the above method with a computer-aided design system, which comprises a memory suitable for storing a first modeled object, a second modeled object, an initial modeled object, a first graph and a second graph defining respectively the first and second modeled objects, and a graphical user interface coupled with a processor and the memory.

According to another aspect, the invention further proposes computer readable storage medium having recorded thereon the above computer program.

BRIEF DESCRIPTION OF THE DRAWINGS

Embodiments of the invention will now be described, by way of non-limiting example, and in reference to the accompanying drawings, where:

FIGS. 2-9 show an example of the step of computing in the invention method,

FIGS. 19-54 show an example of the overall process in embodiments of the invention.

DETAILED DESCRIPTION OF THE INVENTION

Figure 1:
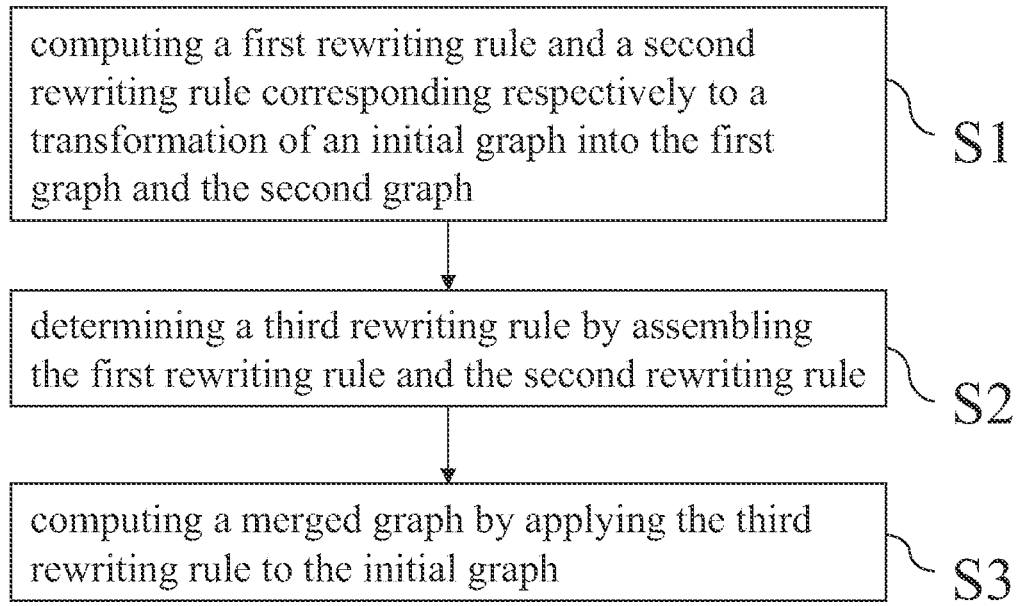
FIG. 1 shows a flowchart of the method of the present invention.

With reference to the flowchart of FIG. 1, it is proposed a computer-implemented method for merging a first modeled object with a second modeled object. The first and second modeled objects are modified versions of an initial modeled object. The method comprises merging a first graph and a second graph. The first graph and the second graph define respectively the first and second modeled objects. For this, the method comprises computing (S1) a first rewriting rule and a second rewriting rule. The first rewriting rule and the second rewriting rule correspond respectively to a transformation of an initial graph into the first graph and the second graph. The initial graph defines the initial object. The first rewriting rule specifies a first part from the initial graph which is to be replaced when transforming the initial graph into the first graph, a first replacement to replace the first part, a first interface between the first part and the first replacement, first morphisms from the first interface to the first part and to the first replacement respectively. The second rewriting rule specifies a second part from the initial graph which is to be replaced when transforming the initial graph into the second graph, a second replacement to replace the second part, a second interface between the second part and the second replacement, second morphisms from the second interface to the second part and to the second replacement respectively. The method further comprises determining (S2) a third rewriting rule by assembling the first rewriting rule and the second rewriting rule. The third rewriting rule specifies an assembled part which is an assembly of the first part and the second part, an assembled replacement which is an assembly of the first replacement and the second replacement, an assembled interface which is an assembly of the first interface and the second interface, assembled morphisms from the assembled interface to the assembled part and the assembled replacement respectively. The method also comprises computing (S3) a merged graph by applying the third rewriting rule to the initial graph. Such a method is an improvement for the merging of modeled objects.

The method is for merging a first modeled object with a second modeled object wherein the first and second modeled objects are modified versions of an initial modeled object. Typically, two different users doing collaborative design modify a respective copy of a same initial modeled object. The method provides for merging the two modified copies. In an example indeed, the first object is provided by a first user performing a first modification on the initial modeled object, and the second modeled object is provided by a second user performing a second design modification on the initial modeled object which is different from the first design modification.

A modeled object is an object modeled by data allowing a computer manipulation of the object. By extension, it designates the data itself. In its broadest lines, the method is intended for merging any type of modeled objects, as long as the modeled objects are defined by a graph. Thus, in the method, all modeled objects are defined by a respective graph. Indeed, the method comprises merging a first graph and a second graph defining respectively the first and second modeled objects. The data modeling the modeled objects may thus include data representing graphs. Alternatively, the data modeling the modeled object may include data allowing the retrieval of graphs. A graph is a structure comprising nodes and arcs, and a relationship wherein each arc is in relation with two nodes. In the context of a computer-implemented method, all these elements (nodes and arcs) may be referenced and pointers may lead to them. These elements may also point to other data such as geometrical data. In the following, the modeled objects may be assimilated to the graphs defining them.

The objects may for example be books. In such a case, the graphs defining the objects may be trees wherein nodes represent chapters, parts, paragraphs, sentences, words and the arcs represent the "comprise/comprised by" relationship. In such a case, the method can be used for merging two books which are versions of an initial book modified for example by a different writer each time. The objects may also be 2D drawings, mathematical formulas, audio files, video clips and so on.

In the context of applying the method in CAD, the objects may typically be 3D modeled objects, e.g. representing a product such as a part or an assembly of parts. By "3D modeled objects", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

In case the modeled objects are 3D modeled objects, the graphs may be any graphs defining the objects as known from the prior art. For examples, the graphs may be the boundary representation graphs (B-rep) of the objects. These graphs are usually stored in the data modeling the modeled objects in CAD systems, and using these graphs thus speeds up the method, as no other graphs need to be computed. Alternatively, in a history-based CAD system the graphs may be the history graphs (which are tree graphs). In any case, the method may be applied whichever the type of the graph used. Thus, the following does not focus on the type of graphs used to define the objects.

The method comprises computing (S1) a first rewriting rule and a second rewriting rule. The first rewriting rule and the second rewriting rule correspond respectively to a transformation of an initial graph into the first graph and the second graph. The initial graph defines the initial modeled object just like the first and second graphs define the first and second modeled objects.

A rewriting rule is data coding a modification of a graph. The expression "rewriting rule" corresponds here to a "double push-out" (DPO) as defined in the thesis of W. Kahl entitled "A relation-algebraic approach to graph structure transformation", which is based on the theory of categories, and may be designated as such in the following. Basically, a rewriting rule specifies a part of the graph which is to be replaced and its replacement, as well as data allowing the replacing. The method is based on language theory of graph rewriting, which is itself based on the mathematical category theory. The double push-out graph rewriting rule is preferred here as opposed to single push-out or partial morphism. A DPO rule clearly identifies the interface (also called "gluing condition" hereafter) of the rewriting rule, which in turn clearly identifies the invariant portion of the modified graph. This allows the computation of a merged graph in more situations, as well as a potential evaluation of compatibility.

The exact constitution of the rewriting rules is provided right below with reference to the first rewriting rule. All rewriting rules in the method follow the same format.

The first rewriting rule specifies a first part from the initial graph which is to be replaced when transforming the initial graph into the first graph, a first replacement to replace the first part, a first interface between the first part and the first replacement, first morphisms from the first interface to the first part and to the first replacement respectively. An "interface" is a graph which corresponds to the support of the transformation. A "morphism", which are known from the theory of categories, are, in the context of a computer-implemented method, pointers which link the elements of the interface to elements of the "replacee" (i.e. the part to be replaced) and the replacement. Unless otherwise mentioned, all graph morphisms of the method are injections. In the context of a computer-implemented method, rewriting rules are thus basically a set of instructions for performing logical operations on graphs. Therefore, applying a rewriting rule is done fast.

Similarly, the second rewriting rule specifies a second part from the initial graph which is to be replaced when transforming the initial graph into the second graph, a second replacement to replace the second part, a second interface between the second part and the second replacement, second morphisms from the second interface to the second part and to the second replacement respectively.

The method further comprises determining (S2) a third rewriting rule by assembling the first rewriting rule and the second rewriting rule. In other words, the first and second parts to be replaced (i.e. the replacees), replacements, interfaces, morphisms are all assembled into one single rewriting rule (the third rewriting rule). Following the same format as the first and second rewriting rules, this third rewriting rule specifies an "assembled part" which is an assembly of the first part and the second part, an "assembled replacement" which is an assembly of the first replacement and the second replacement, an "assembled interface" which is an assembly of the first interface and the second interface, "assembled morphisms" which are morphisms from the assembled interface to the assembled part and the assembled replacement respectively. By "assembling" elements (i.e. replacee, replacement, interface, morphisms) of the first and second rewriting rules, it is meant for each element that some constituents of the element of the first rewriting rule are gathered with some constituents of the element of the second rewriting rule. There are several ways of doing that which are explained later.

The method also comprises computing (S3) a merged graph by applying the third rewriting rule to the initial graph. Applying the third rewriting rule to the initial graph may consist of replacing in the initial graph the assembled part by the assembled replacement.

The method allows for the merge of two modeled objects defined by graphs which derive from a same initial modeled object. This is typically the case of collaborative design. Indeed the method allows the merge of the graphs underlying the objects. The merged graph (i.e. the third graph) obtained may later be used to retrieve the merged object. For example, the merged graph may be translated in a merged modeled object. This may be accomplished by ways known per se and with which the present method is not directly concerned. In the context of CAD in particular, the merged modeled object may be displayed. This allows user verification of the merge.

The method is an improvement for the merge of modeled objects. The merge of graphs allows the manipulation throughout the whole method of graphs, which implies logical operations. Logical operations consume little resource and the method is thus efficient in terms of CPU usage. As a consequence, the method is fast. Furthermore, the method does not require the determination of a common sub-graph between the first graph and the second graph. Indeed, the first and second rewriting rule are determined independently and then assembled in a third rewriting rule. Thus, the method also works when a same element of the initial graph is modified concurrently in the first and second graphs. In other words, the method may be applied in more situations. To further highlight the advantages of the method, a same element of the initial graph may be modified concurrently in the first and second graphs.

The method provides a generic solution to the graph merging and conflict management problems. It is not related to any particular application (a CAD application being an example of an application) and can be reused by any application provided the appropriate graph translator is available. This makes the core technology reusable and saves software development.

The robustness of the method is that it may always provide a merged graph. Existence of conflicts is not a difficulty. A resulting merged graph valid in terms of arcs and nodes connections may always be output. Its application significance needs human interpretation through the translator. As will be detailed, all possible conflict free partial solutions may be proposed so that the designer can make a decision. Usual boundary interface and data ownership can be managed more fluently, since the concepts of conflict and compatible change are driven by the nature of modifications and not by data ownership.

The method may also be used for the merge of a plurality of more than two modeled objects, for example by repeatedly applying the method two-by-two on the plurality of objects.

An example of the step of computing (S1) the first rewriting rule is now detailed with reference to FIG. 2-9. Computing the second rewriting rule may be performed similarly.

In the example, the general process followed is that the computing of the first rewriting rule and the second rewriting rule comprises determining a first common part (H) between the initial graph (A) and the first graph (B), and a second common part (H') between the initial graph (A) and the second graph (B'). The computing also comprises determining a first subtraction (B–H) between the first graph (B) and the first common part (H), a second subtraction (B'–H') between the second graph (B') and the second common part (H'), a third subtraction (A–H) between the initial graph (A) and the first common part (H), and a fourth subtraction (A–H') between the initial graph (A) and the second common part (H'). The computing further comprises determining first end nodes (Adh(B–H)∩H) which are nodes of the first common part (H) missing from arcs of the first subtraction (B–H), second end nodes (Adh(B'–H')∩H') which are nodes of the second common part (H') missing from arcs of the second subtraction (B'–H'), third end nodes (Adh(A–H)∩H) which are nodes of the first common part (H) missing from arcs of the third subtraction (A–H), and fourth end nodes (Adh(A–H')∩H') which are nodes of the second common part (H') missing from arcs of the fourth subtraction (A–H'). The computing further comprises computing the first interface (G) as a union between the first end nodes (Adh(B–H)∩H) and the third end nodes (Adh(A–H)∩H), the second interface (G') as a union between the second end nodes (Adh(B'–H')∩H') and the fourth end nodes (Adh(A–H')∩H'), the first part (L) as a union between the first interface (G) and the third subtraction (A–H), and the third end nodes (Adh(A–H)∩H), the second part (L') as a union between the second interface (G'), the fourth subtraction (A–H'), and the fourth end nodes (Adh(A–H')∩H'), the first replacement (R) as a union between the first interface (G), the first subtraction (B–H), and the first end nodes (Adh(B–H)∩H), and the second replacement (R') as a union between the second interface (G'), the second subtraction (B'–H'), and the second end nodes (Adh(B'–H')∩H'). This allows an efficient and simple retrieval of the first and second rewriting rules in all cases, as only logical operations are involved.

As previously mentioned, the context is defined by an initial graph A and two modified versions of graph A, the first and second graphs noted B and B'. Saying that B is a modified version of A may mean that some elements (arcs and/or nodes) of A may be deleted in B and that some new elements (arcs and/or nodes) may be created in B. In other words, there may exist a portion of A inside B. Formally, this is captured by graph H and two morphisms toward A and B respectively. This set of three graphs and two morphisms is called a "span" (known from the theory of categories) and is noted: A←H→B (the letters designating the categories and the arrows designating the morphisms). Similarly, graph B' is a modification of graph A so there exists another span A←H'←B'. It is to be noted that in the context of the method, the categories are discrete graphs. Thus, whenever a "category" is mentioned in the following, it refers to graphs.

The first step in the example of FIGS. 2-9 is to retrieve the DPO rule defined by the span A←H→B. The DPO rule is the smallest span L←G→R where the gluing condition G (the interface) is a discrete graph and such that B is written from A through the DPO rule L←G→R. Traditionally, this is summarized by the following diagram, which represents the first rewriting rule.

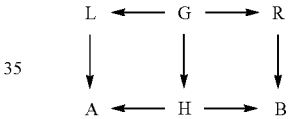

A is the push-out of L and H along G and B the push-out of R and H along G, which, according to category theory, is noted $A=L\cup_G H$ and $B=R\cup_G H$. According to the theory of categories, a push-out of two categories along another category is the reunion of the two categories after they are placed in the context of the other category thanks to morphisms from the other category to the two categories. The inverse operation (i.e. finding the other category from the two categories and their reunion) is called the "pull-back".

The principle of the example is to keep only relevant sub-graphs of A, H and B by removing invariant data. This may be performed through the following steps. Let A–H be the set of arcs and nodes of graph A that are not in graph H. This does not define a new graph since some arcs may have no nodes to connect. In order to define a proper graph, let Adh(A–H) be the set of arcs and nodes A–H enriched with missing end nodes (taken from graph H). Clearly, this defines a graph subtraction. Notation Adh(•) is chosen by topological analogy with points and lines used to draw graphs on a sheet of paper. Then, let us define the intersection Adh(A–H)∩H, which is a discrete graph (vertices but no arcs) since there is no H arc in Adh(A–H). Symmetrically, let us define Adh(B–H)∩H. The gluing condition G of the rewriting rule is then defined by G=(H∩Adh(A–H))∪(H∩Adh(B–H)) or, equivalently, $G=H\cap(Adh(A-H)\cup(B-H))$.

The left side L of the rewriting rule is then defined by L=Adh(A–H)∪G or, equivalently, $L=Adh(A-H)\cup(H\cap Adh(B-H))$.

Finally, the right side R of the rewriting rule is $R=Adh(B-H)\cup G$ or, equivalently, $$R=Adh(B-H)\cup(H\cap Adh(A-H)).$$

The same pattern applied to graph B' defines the span $A\leftarrow H'\rightarrow B'$ and the rewriting rule $L'\leftarrow G'\rightarrow R'$ so that the following diagram designates a double push-out rewriting rule (the second rewriting rule).

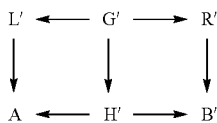

So far, the given modified graphs B and B' (first and second graphs) are obtained from initial graph A through two DPO rules (first and second rewriting rules), as illustrated below.

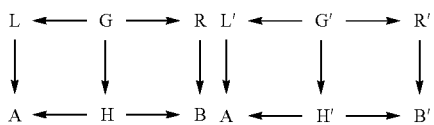

It can be proven that $A=L\cup_G H$, $B=R\cup_G H$ and $A=L'\cup_G H'$, $B'=R'\cup_G H'$.

Figure 2:
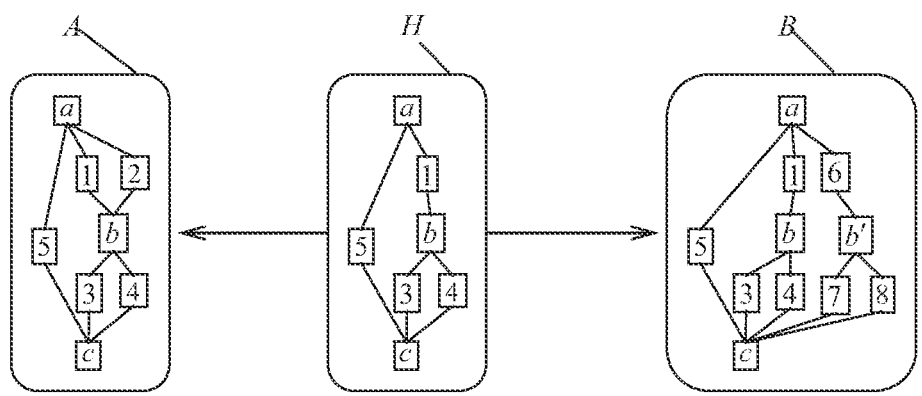

In FIGS. 2-9 now, nodes are named by letters, arcs are named by numbers. FIG. 2 shows an example of a starting span $A\leftarrow H\rightarrow B$ for the first graph B. Intermediate results for left side and gluing condition are provided in FIGS. 3-5. Notice that A−H is not a graph. Intermediate results for right side and gluing condition are provided in FIGS. 6-8. Notice that B−H is not a graph. Synthesis of span $L\leftarrow G\rightarrow R$ is provided in FIG. 9. This is the DPO rule that changes A into B (i.e. the first rewriting rule for the example of FIG. 2).

An example of how to determine (S2) the third rewriting rule is now provided. Surprisingly, this specific determination of the example is always possible through a dedicated sequence of push-out and pull-back operations. The following diagram, extracted from the diagram above, is useful to perform categorical operations.

$$R\leftarrow G\rightarrow L\rightarrow A\leftarrow L'\leftarrow G'\rightarrow R'$$

Let $K_L:=L\times_A L'$ be the pull-back of the left sides along initial graph A.

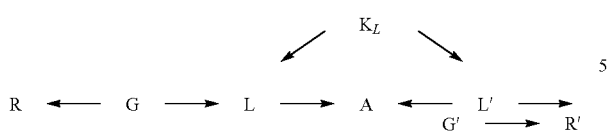

Let $K_G:=G\times_A G'$ be the pull-back of the gluing conditions along initial graph A.

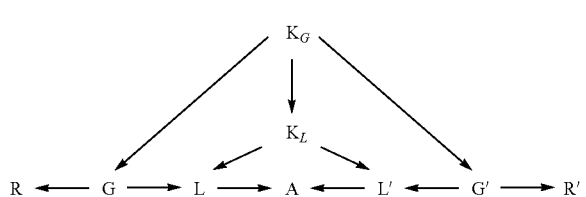

Category theory guarantees the existence of a unique morphism $K_G\rightarrow K_L$ according to the following diagram.

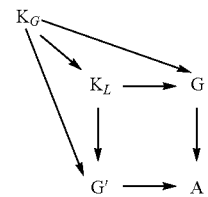

The left side $\tilde{L}$ of the merged rewriting rule (i.e. the third rewriting rule foreseen in the example) is the push-out of the left sides along $K_L$, that is to say $\tilde{L}:=L\cup_{K_L} L'$.

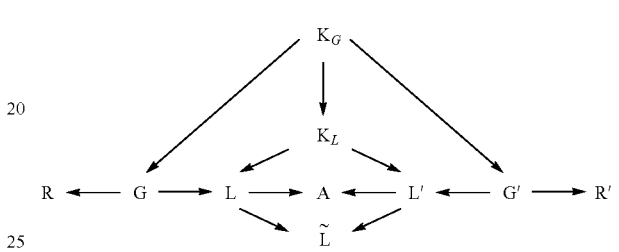

The right side $\tilde{R}$ of the merged rewriting rule is the push-out of the right sides along $K_G$, that is to say $\tilde{R}:=R\cup_{K_G} R'$.

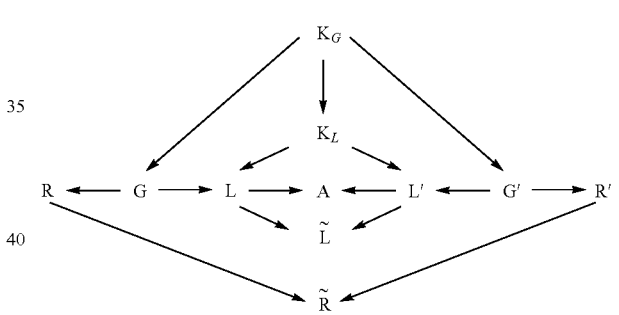

The gluing condition $\tilde{G}$ of the merged rewriting rule is the push-out of the gluing conditions along $K_G$, that is to say $\tilde{G}:=G\cup_{K_G} G'$.

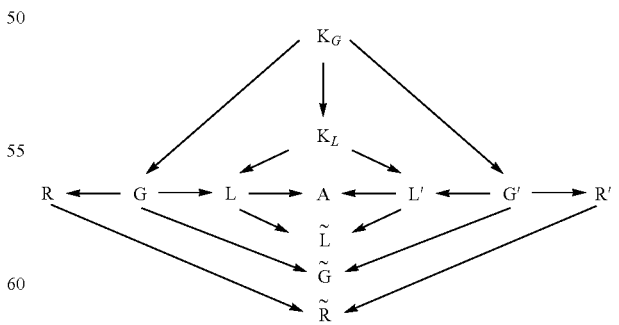

Now, morphisms $\tilde{L}\leftarrow\tilde{G}$ and $\tilde{G}\rightarrow\tilde{R}$ are required to define the span $\tilde{L}\leftarrow\tilde{G}\rightarrow\tilde{R}$. According to previous diagram, there exists morphisms $G\rightarrow\tilde{L}$ and $G'\rightarrow\tilde{L}$, so, since $\tilde{G}=G\cup_{K_G}G'$, there exists a unique morphism $\tilde{G}\rightarrow\tilde{L}$.

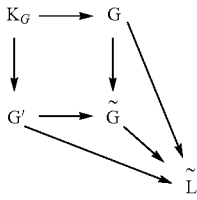

On the other hand, there exists morphisms G→R̃ and G'→R̃, so, since R̃=R∪$_{K_G}$R', there exists a unique morphism G̃→R̃.

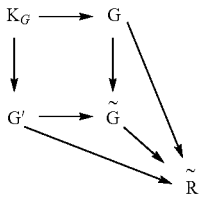

Finally, there exists a morphism L̃→A. Indeed, by definition, L̃=L∪$_{K_L}$L', and, by hypothesis, there exist two morphisms L→A and L'→A. So, there exists a unique morphism L̃→A.

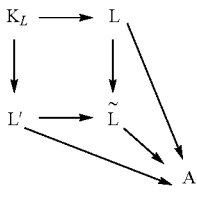

The categorical construction is summarized in the following diagram.

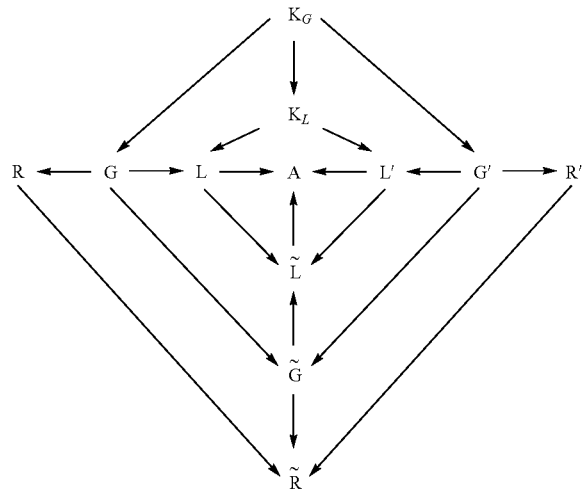

Applying the merged DPO rewriting rule L̃←G̃→R̃ to the initial graph A would yield the merged graph B̃ according to the standard DPO diagram.

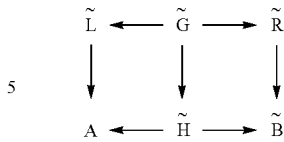

The previous explanations showed how a third rewriting rule may be determined automatically and directly (thus very quickly) from the first and second rewriting rules. The determining of the third rewriting rule may alternatively be performed according to a prior evaluation of compatibility between the first rewriting rule and the second rewriting rule. In other words, the determining of the third rewriting rule may be subjected to a compatibility between the first and second rewriting rules which is evaluated beforehand. The third rewriting rule will then depend on this compatibility. This allows a more refined merge.

In an example, the evaluation of compatibility may comprise comparing a part intersection (L∩L') between the first part (L) and the second part (L') to an interface intersection (G∩G') between the first interface (G) and the second interface (G'). The evaluation is then negative when the part intersection (L∩L') is not equal to the interface intersection (G∩G').

Indeed, the problem of compatibility may be to answer the following questions. Can the two DPO rules L←G→R and L'←G'→R' be applied sequentially? If yes, does the result depend on the sequence order? If no, why cannot they be applied sequentially? The compatibility criterion provides all the answers and is thus in this case resembling a commutativity criterion.

The structure of a DPO rule is now shortly explained. Left side L is the pattern identified in the initial graph. Right side R is the new material that replaces pattern L. This substitution is carefully controlled by the gluing condition G. The role of this interface is to guarantee that replacing L by R preserves the graph structure. All arcs and nodes of L excluding those of G are replaced by arcs and nodes of R. Consequently, the DPO rules are compatible if they do not share any overwritten elements, in other words if the patterns intersection is included in the interfaces intersection, formally: L∩L' ⊂ G∩G'. Since the reverse inclusion L∩L' ⊃ G∩G' is always true, it is equivalent to formulate the compatibility criterion as L∩L'=G∩G'. Of course, in practice, only L∩L' ⊂ G∩G' needs to be evaluated for faster evaluation.

Now the answers to the above questions: if the DPO rules L←G→R and L'←G'→R' are compatible, that is if L∩L'=G∩G', then they can be applied sequentially in any order and the result does not depend on the sequence order. If the DPO rules are not compatible, that is L∩L'≠G∩G', they cannot be applied sequentially. At least one element of one left side is missing after the first rule is applied. The intersection L∩L' provides elements (arcs and nodes) that are written differently by the PDO rules. These are referred to as "conflict" elements. Notice that if L∩L'≠G∩G' then L∩L' is not empty, otherwise G∩G' would be empty as well since L∩L' G∩G' and there would be a contradiction. In case the evaluation of compatibility is negative, the determining of the third rewriting rule may be performed via user interaction. Conflict solving is in this case a human process and the goal is to provide an efficient environment for the designer to make decisions. This speeds up the overall design process and makes the design work more ergonomic (e.g. fewer actions of the users are required to reach a merged model satisfyingly refined). Suppose now that the DPO rules are not compatible, that is $L \cap L' \neq G \cap G'$. The principle of conflict manager is to separate each DPO rule $L \leftarrow G \rightarrow R$ and $L' \leftarrow G' \rightarrow R'$ into connected components $L_i \leftarrow G_i \rightarrow R_i$, $i=1, \ldots, n$ and $L'_j \leftarrow G'_j \rightarrow R'_j$, $j=1, \ldots, n'$. This is further explained below. Now, couples of sub-rules such that $L_i \cap L'_j = G_i \cap G'_j$ provide a partial and conflict free solution. The conflict manager helps the designer to navigate in the field of all possible partial solutions.

Determining of the third rewriting rule may thus comprise decomposing the first rewriting rule into first connected components and the second rewriting rule into second connected components. Each first connected component gathers elements of the first part (L), the first interface (G) and the first replacement (R), which are all connected through the first morphisms. Each second connected component gathers elements of the second part (L'), the second interface (G') and the second replacement (R'), which are all connected through the second morphisms;

Let us now define the connectivity of a DPO rule $$L \xleftarrow{\Phi_L} G \xrightarrow{\Phi_R} R.$$

Its connectivity is that of a certain graph defined as follows. Draw the graphs L, G and R separately and add to this drawing all arcs defined by morphism $\Phi_L$ connecting nodes of L and G, and all arcs defined by morphism $\Phi_R$ connecting nodes of G and R. Then, by definition, connected components of the DPO rule are those of this graph (i.e. the graph comprising all nodes of the graphs of the third rewriting rule as nodes, all arcs of the third rewriting rule as arcs, and all pointers of the morphisms of the third rewriting rule as further arcs).

Formally, a connected component of span $$L \xleftarrow{\Phi_L} G \xrightarrow{\Phi_R} R$$

is a connected component of the graph $S=(V_S, E_S, \alpha_S, \omega_S)$. Nodes of graph S are nodes of graphs L, G and R, that is to say $V_S = V_L \cup V_G \cup V_R$ supposing that $V_L \cap V_G = \phi$, $V_L \cap V_R = \phi$ and $V_G \cap V_R = \phi$. Arcs of graph S are those of graphs L, G and R together with two sets $M_L$ and $M_R$ of arcs defined below. $E_S = E_L \cup E_G \cup E_R \cup M_L \cup M_R$ where $$M_L = \{m_g^L; g \in V_G\} \text{ and}$$
$$\alpha_S(m_g^L) = g$$
$$\omega_S(m_g^L) = \Phi_L(g)$$
$$M_R = \{m_g^R; g \in V_G\} \text{ and}$$
$$\alpha_S(m_g^R) = g$$
$$\omega_S(m_g^R) = \Phi_R(g)$$

The definition is completed by stating that $\alpha_S/E_L = \alpha_L$, $\omega_S/E_L = \omega_L$, $\alpha_S/E_R = \alpha_R$, $\omega_S/E_R = \omega_R$.

Figure 10:
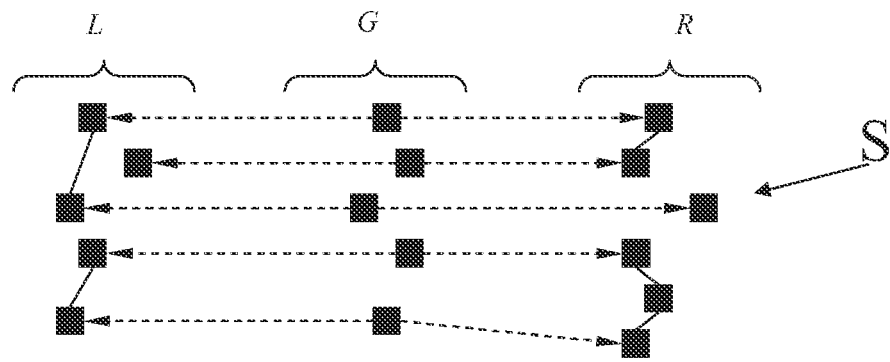
FIGS. 10-12 show an example of determining the connected components of a DPO (Double Push Out) rule.
Figure 11:
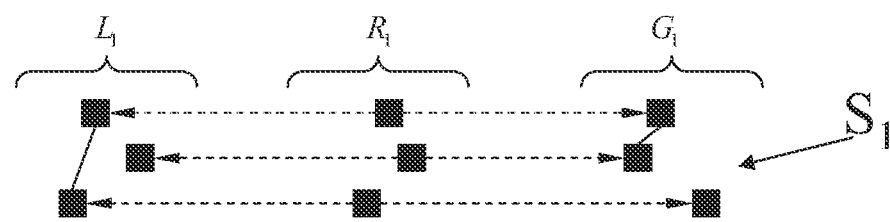
Figure 12:
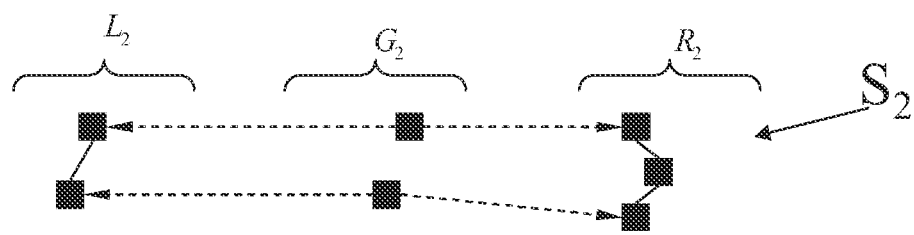

FIGS. 10-12 provide an example of determining the connected components of a DPO rule $$L \xleftarrow{\Phi_L} G \xrightarrow{\Phi_R} R.$$

Nodes and arcs names are not detailed. Nodes are dark squares, arcs of graphs L, R are solid lines and arcs of morphisms $\Phi_L$ and $\Phi_R$ are dotted lines. Consequently, graph S is defined by dark squares nodes, solid and dotted lines arcs.

Graph S includes two connected components $S_1 = L_1 \leftarrow G_1 \rightarrow R_1$ and $S_2 = L_2 \leftarrow G_2 \rightarrow R_2$ as illustrated respectively on FIGS. 11 and 12. Each connected component and defines a DPO rule, and they can be applied independently. It must be noticed that sub rules of the same rule are always pair wise compatible because, by nature, $L_i \cap L_j = \phi$ and $G_i \cap G_j = \phi$ so $L_i \cap L_j = G_i \cap G_j$ for all $i \neq j$.

Performing such a decomposition in connected components allows computing maximal cliques comprised of a first set of first connected components and a second set of second connected components. The intersection between elements of the first set coming from the first part (L) and elements of the second set coming from the second part (L') is equal to the intersection between elements of the first set coming from the first interface (G) and elements of the second set coming from the second interface (G'). After such a computation, determining of the third rewriting rule may comprise allowing for user selection of at least one of the cliques, the selected clique constituting the third rewriting rule.

In the following, an example of an algorithm for conflict free maximal partial solution is provided.

Given rewriting rules $L \leftarrow G \rightarrow R$ and $L' \leftarrow G' \rightarrow R'$ featuring conflicts, the goal of the algorithm is to provide the designer with the list of all maximal conflict free partial solutions. After connected sub rules $v_i = L_i \leftarrow G_i \rightarrow R_i$, $i=1, \ldots, n$ and $w_j = L'_j \leftarrow G'_j \rightarrow R'_j$, $j=1, \ldots, n'$ computation, the principle is to find out all sets of indexes $I_p \subset \{1, \ldots n\}$ and $J_p \subset \{1, \ldots n'\}$ such that the following pair wise compatibility and maximality properties are verified.

Pair wise compatibility. For each $i \in I_p$, $v_i$ is compatible with all $w_j$, $j \in J_p$ (and vice versae).

Maximality. For all $k \in I_p$ there exists $j \in J_p$ such that $v_k$ and $w_j$ are not compatible and, conversely, for all $k \in J_p$ there exists $i \in I_p$ such that $v_i$ and $w_k$ are not compatible.

Clearly, the rewriting rule $V_p$ defined by sub-rules $\{v_i \in I_p\}$ is compatible with the rewriting rule $W_p$ defined by sub-rules $\{w_j, j \in J_p\}$. So $V_p$ and $W_p$ can be merged together and the merged rewriting rule can be applied to the initial graph and yields a conflict free maximal partial solution.

In other words, within a conflict free maximal partial solution, sub-rules are pair wise compatible and adding only one rule creates a conflict.

Figure 13:
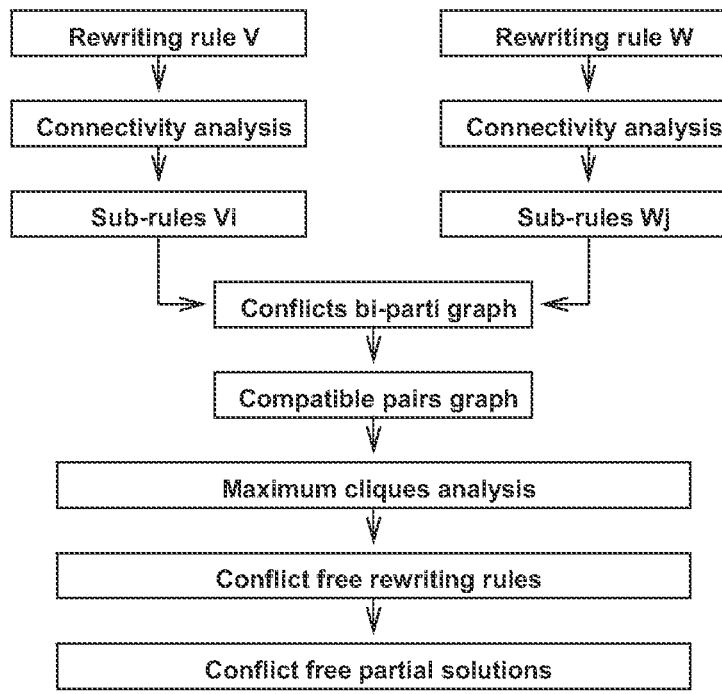
FIG. 13 shows a flowchart of a conflict management solution of the present invention.

The solution, schematized on FIG. 13, reuses the well known algorithm for "enumerating all maximal cliques of a non oriented graph". For this purpose, all compatible pairs of sub-rules are captured in a single graph, including $(v_i, w_j)$, $(v_i, v_j)$ and $(w_i, w_j)$ pairs. Running the maximum cliques enumeration algorithm on this graph yields the expected result. Each maximum clique defines a maximum subset of compatible sub-rules.

Figure 14:
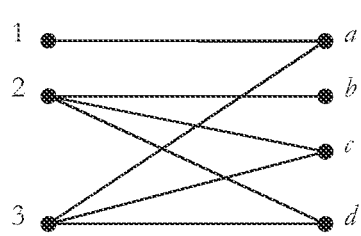
FIGS. 14-16 show an example of computing conflict free maximal partial solution.
Figure 15:
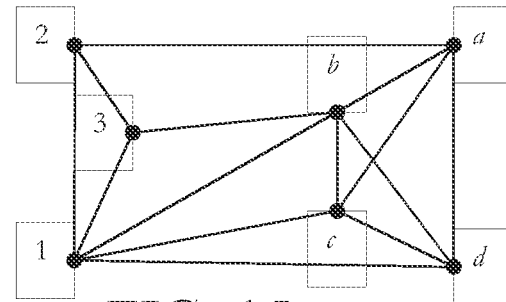
Figure 16:
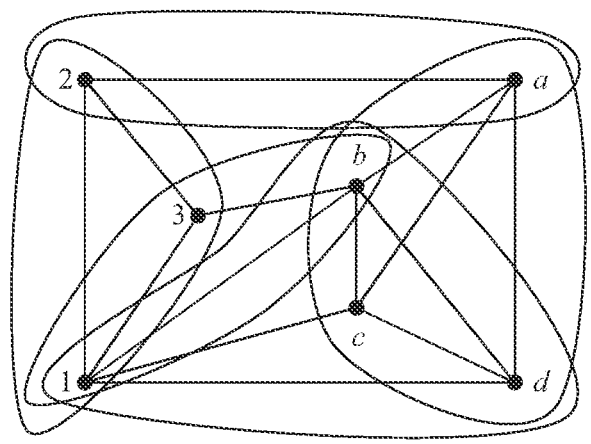

An example of computing conflict free maximal partial solution is provided with reference to FIGS. 14-16.

For simplicity, sub-rules of $L \leftarrow G \rightarrow R$ are named using integers $\{1,2,3\}$ and sub-rules of $L' \leftarrow G' \rightarrow R'$ are named using letters $\{a,b,c,d\}$. FIG. 14 captures conflicts of this example. FIG. 15 is the complementary graph, capturing all compatible pairs. Arcs connecting sub-rules of the same family (typically 1, 2 and 3 altogether as well as a, b c and d altogether) capture the fact that sub-rules of a given rule are pair wise compatible. Running the classical maximal cliques enumeration algorithm yields to the circles on FIG. 16 which show the maximal cliques.

Thus the maximal cliques are $\{1,2,3\}$, $\{a,b,c,d\}$, $\{2,a\}$, $\{1,3,b\}$, $\{1,b,c,d\}$. Cliques of higher interest (for collaborative work) are $\{2,a\}$, $\{1,3,b\}$, $\{1,b,c,d\}$ because they mix sub-rules extracted from both initial rules $L \leftarrow G \rightarrow R$ and $L' \leftarrow G' \rightarrow R'$. In this example, three conflict free partial maximal solutions may be proposed to the designer. Each of them gives birth to a third rewriting rule which in turn provides a conciliation graph C when applied to the initial graph A.

How the user may interact with the system in order to determine the third rewriting rule is now more detailed.

Previous considerations and algorithms provide the end user of the system with interactive solutions to manage conflicts. These solutions may make use of the graph translator that computes the graph from application model and vice versa.

The simplest solution may be for the system to identify conflicting arcs and nodes within the initial graph A thanks to the compatibility criterion $L \cap L' = G \cap G'$ (mainly the arcs and nodes belonging to $L \cap L'$ and not to $G \cap G'$) and to display the corresponding elements of the application model. This helps the user to understand where the conflict is located but it does not give information about how the modification is involved in the conflict.

Next solution may be for the user to run through the list of maximal conflict free merges and for the system to compute and display the corresponding models. Referring to the example of FIGS. 14-16, this list includes {2,a}, {1,3,b} and {1,b,c,d}. This solution does not provide sub-rule selection.

Figure 17:
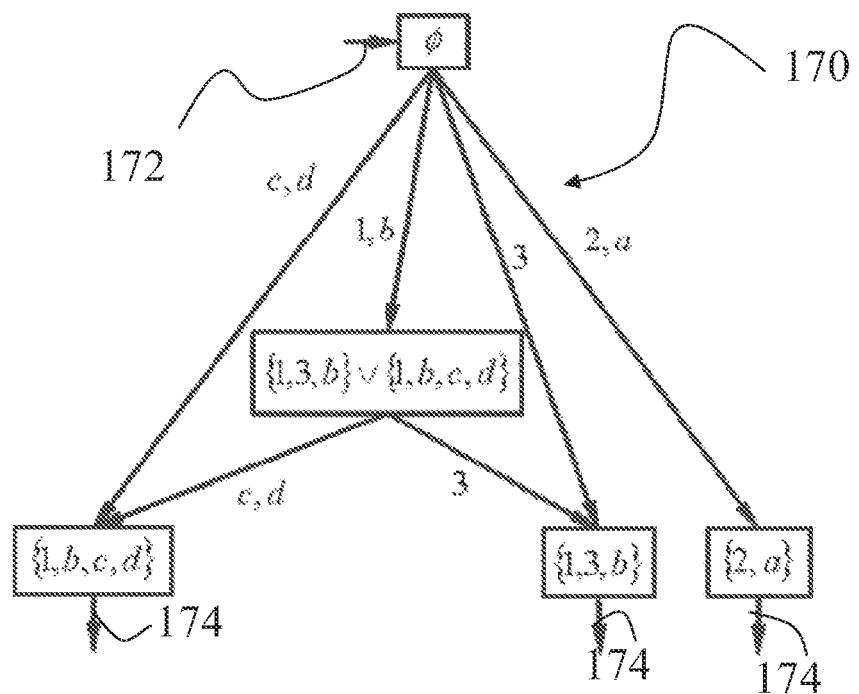
FIG. 17 shows an automaton leading to a conflict free partial merge.

Next solution may be for the system to display the two lists of sub-rules while maintaining their relative compatibilities. By selecting one or more sub-rules in one list, compatible sub-rules of the other list may be highlighted and the resulting conflict free merged model is displayed. In the case maximal cliques are selected, after the user selection of a clique, the method may thus comprise highlighting on the initial modeled object the elements of the selected clique coming from the first part (L) and from the second part (L'), and obtaining a confirmation by the user of the selected clique FIG. 17 illustrates all possible selections leading to a conflict free partial merge through finite automaton 170. Automaton 170 governs sub-rules highlights in the lists according to user selections as well as merged model computation and display. Initial state (input arrow 172) is the empty set $\phi$, meaning that the user did not select anything yet and that any sub-rule can be selected. Final states (output arrows 174) are the meaningful maximal cliques defining conflict free partial merges.

Figure 18:
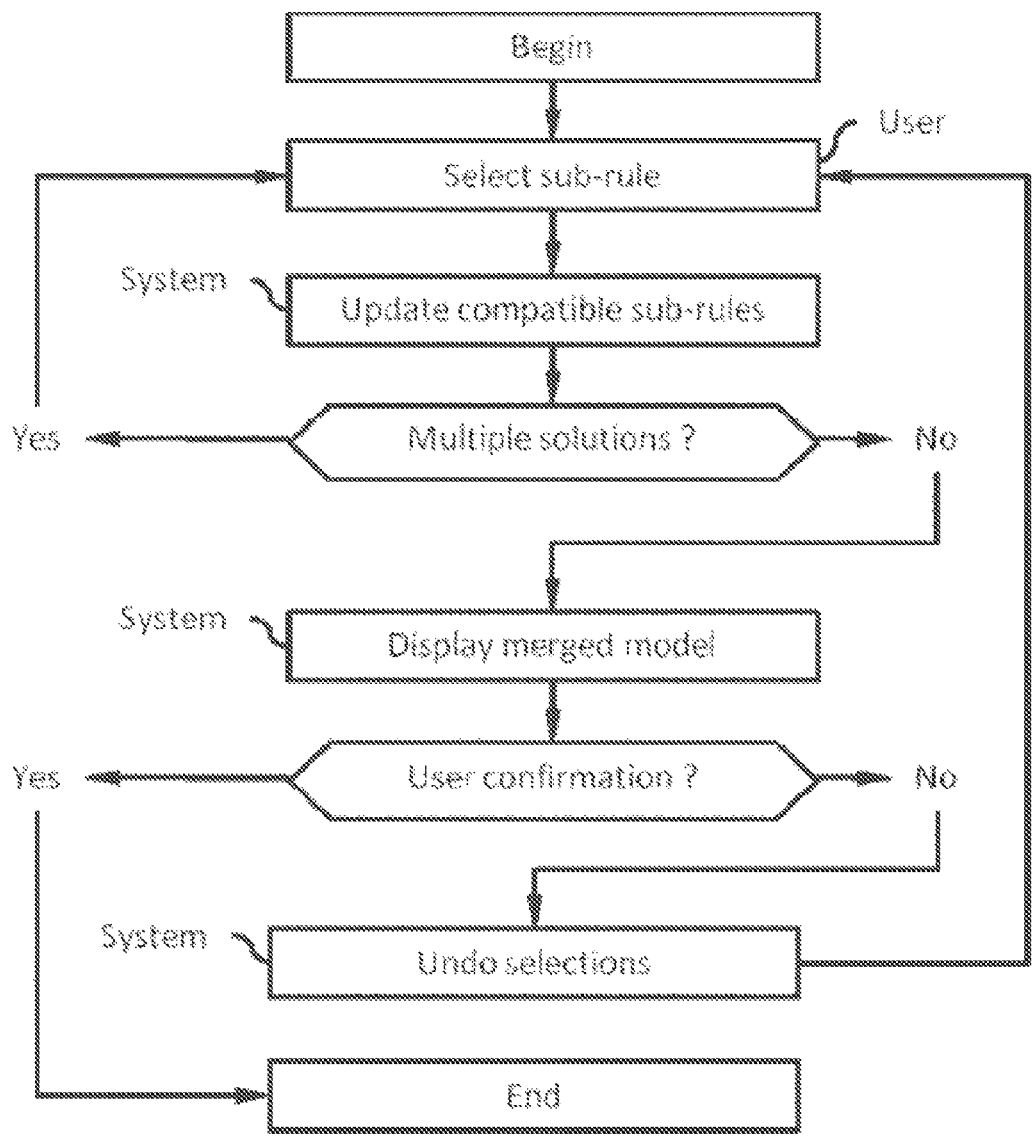
FIG. 18 shows a diagram illustrating a navigation process for conflict management.

For example, if the user selects sub-rule c, the only conflict free partial merge including sub-rule c is {1,b,c,d} and the system displays the corresponding merged model. This computation involves the graph translator. If the user selects sub-rule d, the only conflict free partial merge including sub-rule d is again {1,b,c,d} and the system displays the corresponding merged model (using the graph translator). If the user selects sub-rule b, candidate conflict free partial merges are {1,b,c,d} and {1,3,b} because they both include sub-rule b. The system does not display any merged model, but allows the user to only select sub-rules 3, c or d. If the user selects sub-rule 3, the resulting conflict free partial merge is {1,3,b} and the system displays the corresponding merged model. If the user selects c or d, the resulting conflict free partial merge is {1,b,c,d} and the system displays the corresponding merged model. The interactive interface allows un-selection as well so that the user can freely investigate several combinations of sub-rules. The diagram of FIG. 18 illustrates the navigation process.

While navigating among the conflict free partial merges, the relationships between (graph re-writing) sub-rules and element of the model are a valuable help. For example, when the user pre-selects or selects a sub-rule $L_i \leftarrow G_i \rightarrow R_i$ in the list, the system may highlight the elements of the initial model corresponding to graph $L_i$. Similarly, when the user pre-selects or selects a sub-rule $L'_j \leftarrow G'_j \rightarrow R'_j$ in the list, the system may highlight the elements of the initial model corresponding to the graph $L'_j$.

Another solution would be to allow the computation of the full merged model, including conflicts (as mentioned earlier). This model is generally "incorrect" from the application point of view, and, for this reason, its computation through the graph translator may not be possible. Nevertheless, it can even in such a case be a helpful support for the user to understand the problem. Starting with the merged model including conflicts, the user can step by step remove local conflicts by deactivating sub-rules. After each sub-rule deactivation, the system computes and displays the corresponding model and informs the user when the model is conflict free.

All these solutions clearly render the method and system on which it is run more ergonomic.

An example of the overall process is provided with reference to FIGS. 19-54, including conflict analysis and partial solutions.

In this example, the very first step is for the application to translate its own model into a graph. Designing this translator is for the application specialist to decide which characteristics of the application should be involved in the merge process and conflict solving and which should not. The translator is bi-directional: from the application model toward the graph and from the merged graph and (possibly) conflicts toward the application.

The context is defined by the initial graph A and two modified versions of graph A, the first and second graphs noted B and B'.

The first step is to compute the first rewriting rule that changes A into B and the second rewriting rule that changes A into B'. These rewriting rules are computed in the DPO format.

Then, thanks to the appropriate DPO format of rewriting rules, it is always possible to check if they are compatible. Compatibility means here that they can be applied sequentially in any order and provide the same result. This checking anticipates conflicts. There is no need to actually cross-apply rewriting rules to perform verification.

The rewriting rules are merged, which is always possible, even if they are not compatible. This yields a new rewriting rule (in DPO format) called the merged rewriting rule in the following.

The merged graph $\tilde{B}$ is computed by applying the merged rewriting rule to initial graph A. Notice that the merged graph can always be computed even in case of conflicts.

If the rewriting rules are compatible, the merged graph is translated back to the application, which ends the process.

If the rewriting rules are not compatible, conflicts are identified. Mainly, conflicts arise when an initial element is overwritten by each modification. The translator from abstract graph to the application world can be used to display conflicts in terms of application semantic.

A conflict manager helps the designer to choose a partial solution with no conflict or to edit the merged graph. This step involves the translator from abstract graph to the application world.

Figure 19:
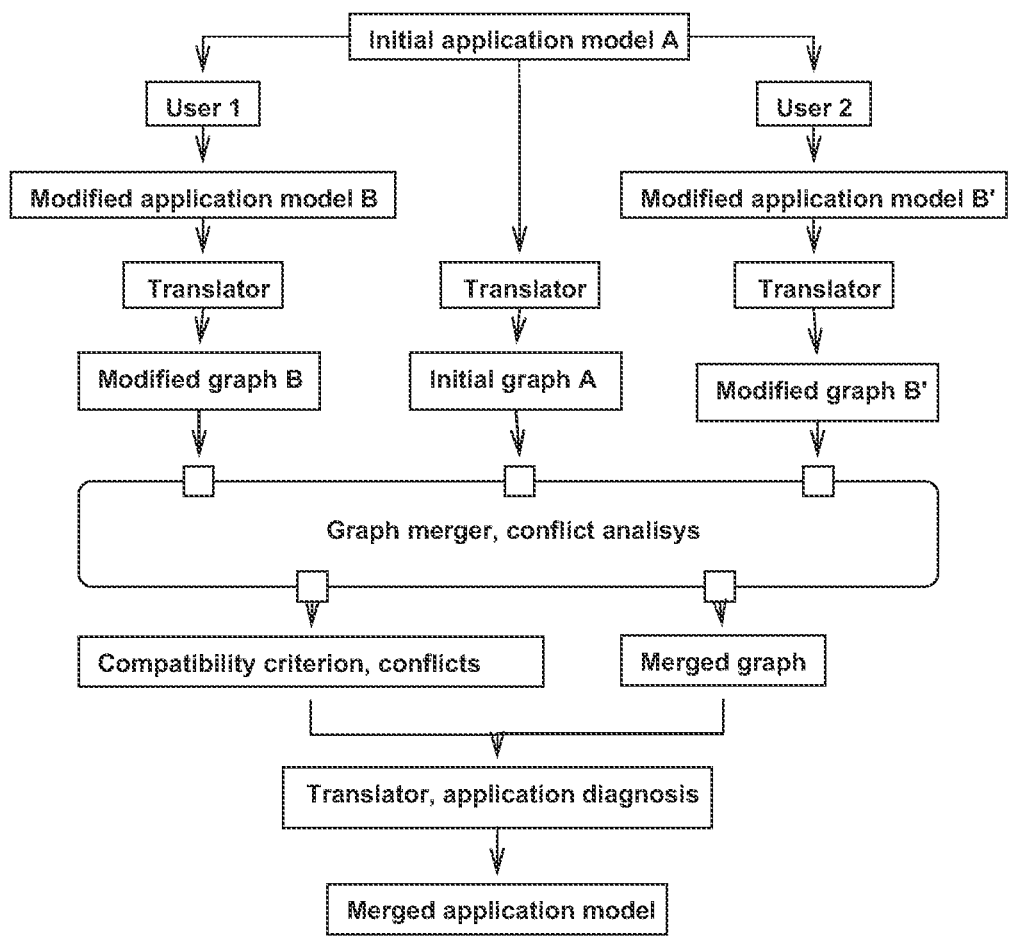
Figure 20:
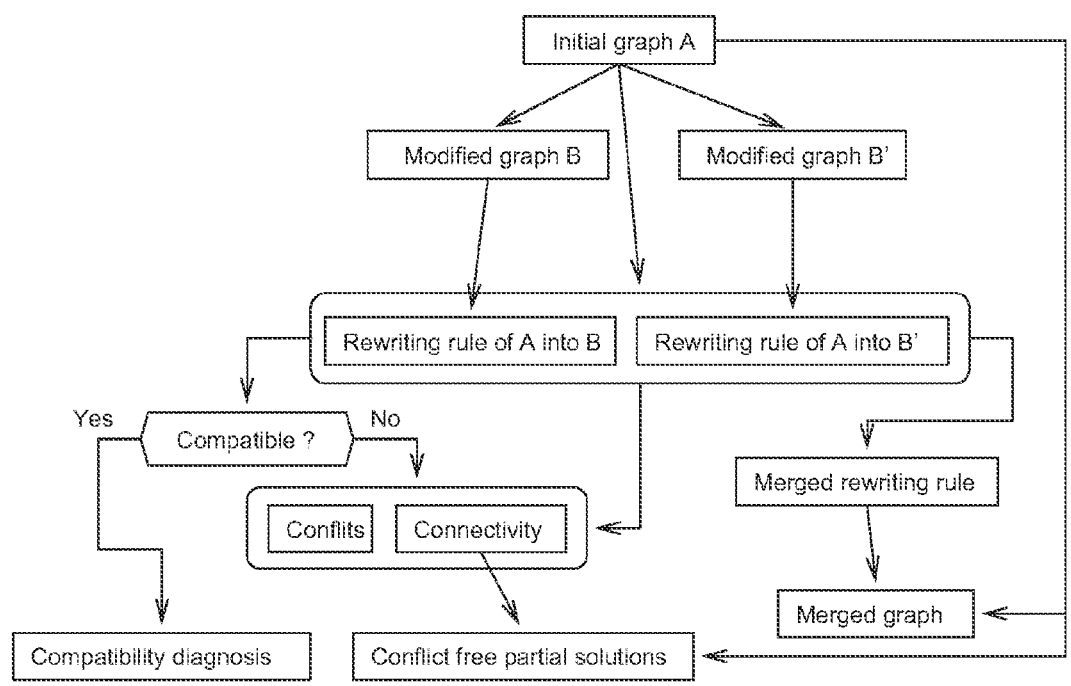
Figure 30:
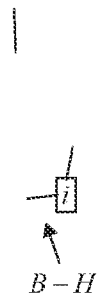
Figure 31:
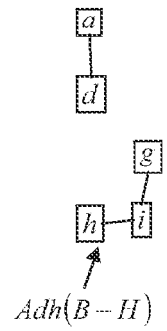
Figure 32:
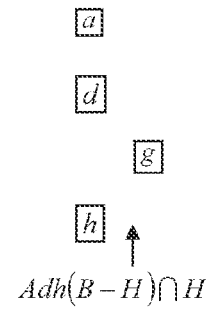
Figure 33:
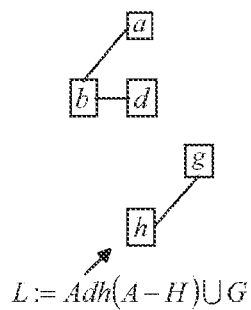
Figure 34:
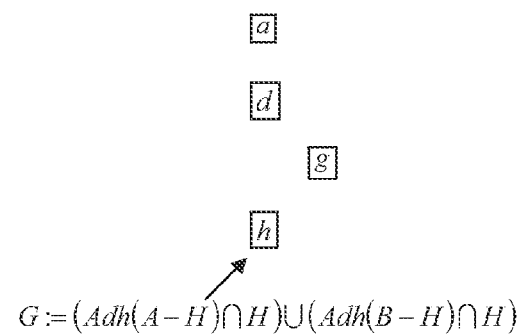
Figure 35:
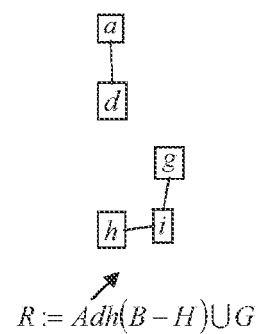
Figure 36:
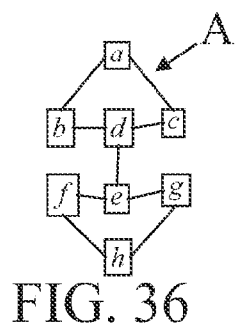
Figure 37:
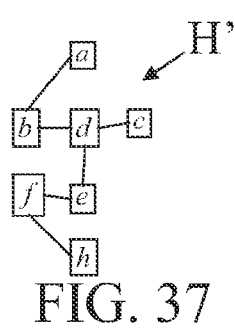
Figure 38:
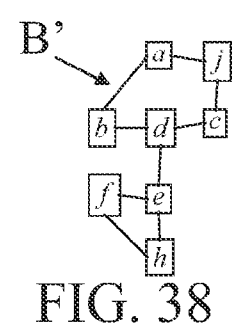

The data flow of FIG. 19 describes the context of the example: translation of application data into an abstract graph and interpretation of graph merging in terms of application semantic. The data flow of FIG. 20 describes an example of the architecture of the graph manipulations of the example.

An example of applying this overall process is now provided with reference to FIGS. 21-54.

The starting graph A is provided in FIG. 22. First and second graphs B and B' are shown on FIGS. 21 and 23 respectively. Intermediate results to compute the DPO rule that changes A into B are now discussed. First of all, the common sub-graph H shown on FIG. 25 and shared by A (shown again on FIG. 24 for convenience) and B (shown on FIG. 26) is obtained by intersection. Intermediate results A–H, Adh(A–H) and Adh(A–H)∩H for left side and gluing condition are shown on FIGS. 27-29. Notice that A–H is not a graph because of endless arcs. Intermediate results B–H, Adh(B–H) and Adh(B–H)∩H for right side and gluing condition are shown on FIGS. 30-32. Notice that B–H is not a graph because of endless arcs. The elements L, G and R of span L←G→R, the DPO rule that changes A into B, are shown on FIGS. 33-35.

Shown on FIGS. 36-47 is the computation of the span L'←G'→R' that changes A into B'. Once more, the common sub-graph H' shown on FIG. 37 shared by A (shown again on FIG. 36 for convenience) and B' (shown on FIG. 38) is obtained by intersection. Intermediate A–H', Adh(A–H) and Adh(A–H')∩H' for left side and gluing condition are shown on FIGS. 39-41. Notice that A–H' is not a graph because of endless arcs. Intermediate results B–H', Adh(B–H') and Adh(B–H')∩H' for right side and gluing condition are shown on FIGS. 42-44. Notice that B'–H' is not a graph because of endless arcs. The elements L', G' and R' of the span L'←G'→R' are shown on FIGS. 45-47.

Figure 48:
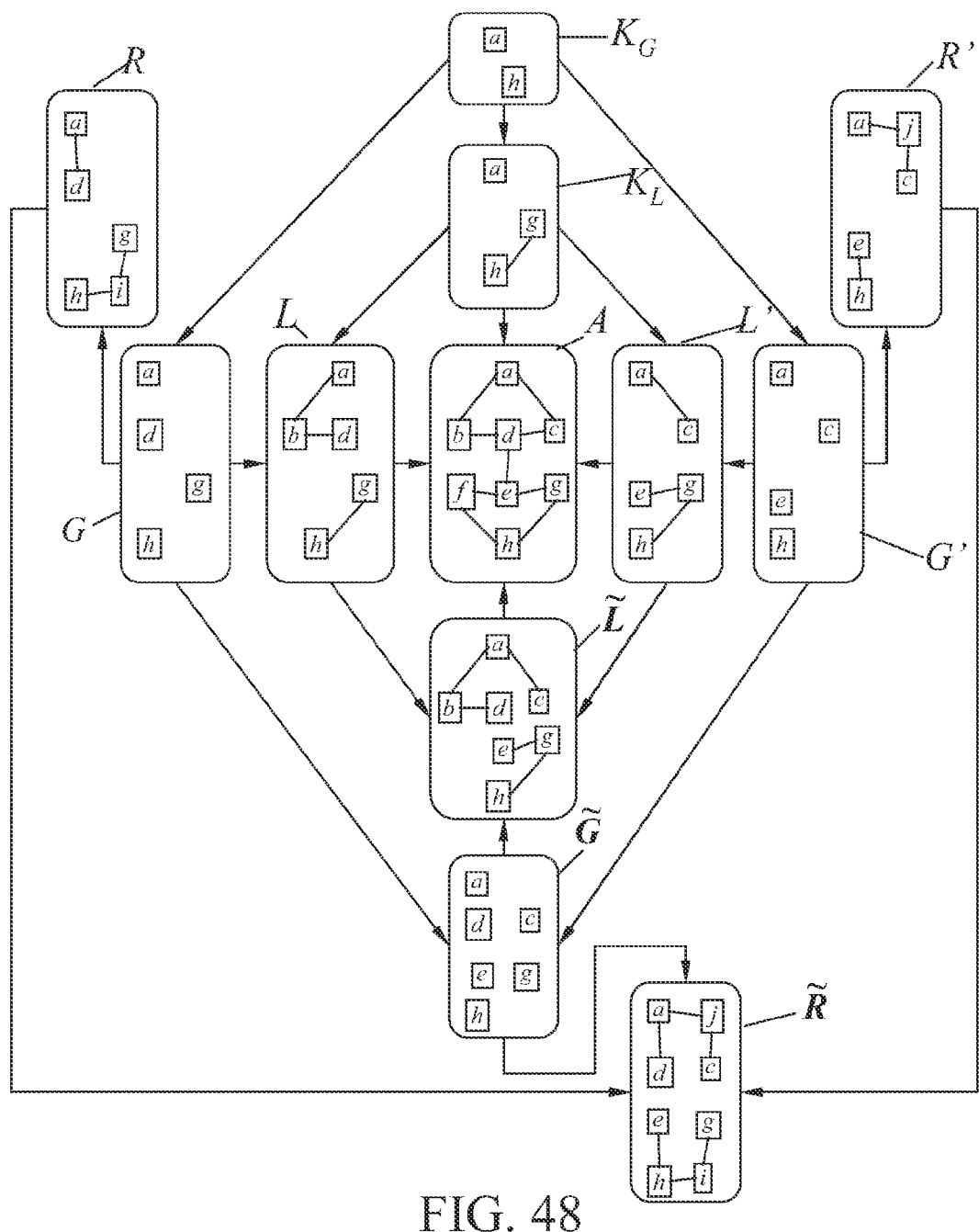
Figure 49:
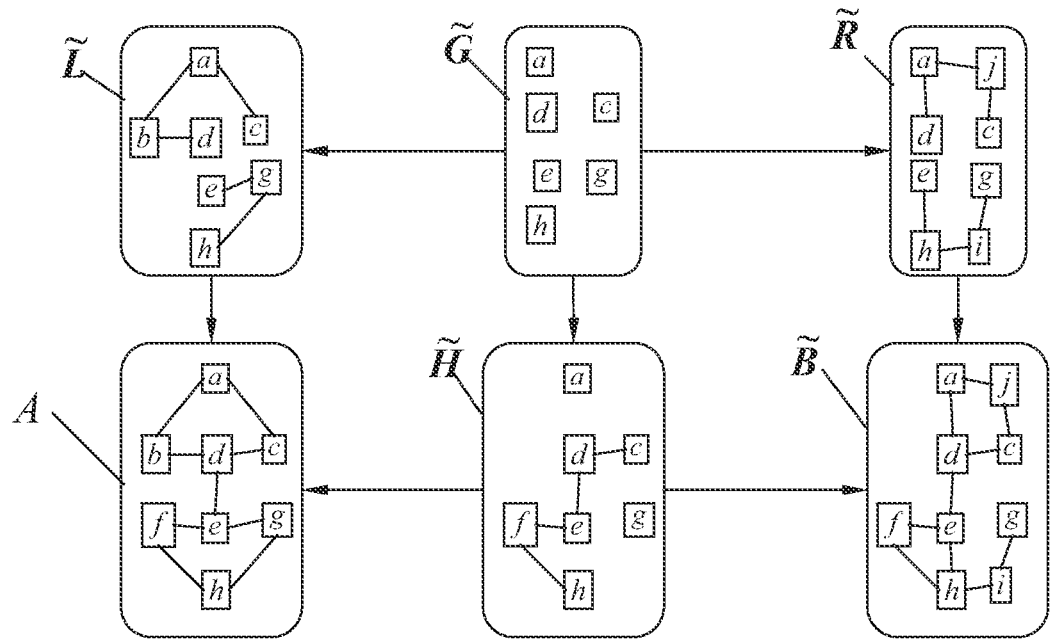

Now the merged DPO rule $\tilde{L}←\tilde{G}→\tilde{R}$ is obtained through the intermediate results represented on FIG. 48. Arrows connecting boxes are graph morphisms. The merged graph $\tilde{B}$ is obtained by applying the merged DPO to the initial graph, as represented on FIG. 49.

The compatibility criterion claims that DPO rules L←G→R and L'←G'→R' would not swap (i.e. commute). Indeed, on one hand L∩L' includes nodes a, g, h and the arc connecting nodes g and h. On the other hand, G∩G' includes nodes g and h. This reveals that the arc of graph A connecting nodes g and h is differently managed in each modified graph. This is a conflict because these two design intents could be antagonistic. Furthermore, DPO rules do not apply sequentially because the first DPO rule would remove the arc connecting nodes g and h from graph A and the second DPO rule would not match its pattern.

Nevertheless, connectivity analysis shows that DPO rules L←G→R and L'←G'→R' can be split into several connected components. Compatibility criterion proves that some sub rule combinations are conflict free.

Figure 50:
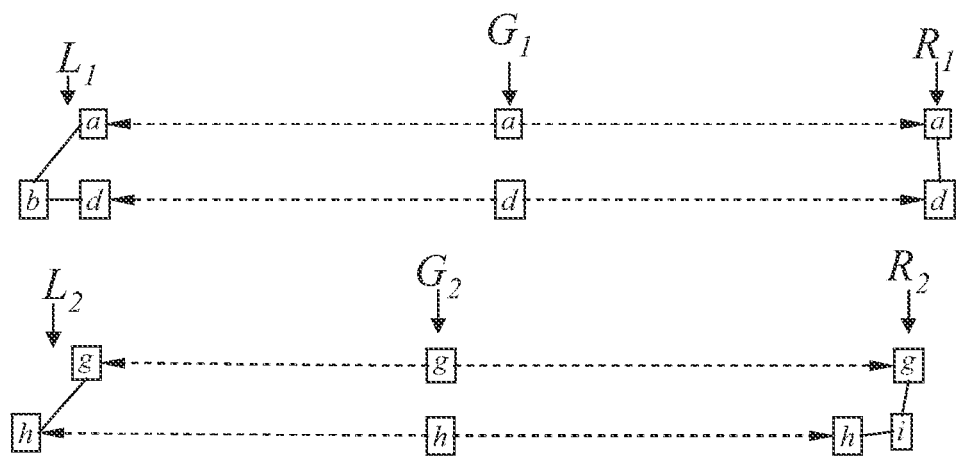

Connected component of DPO rule L←G→R are illustrated on FIG. 50. Connected component of DPO rule L'←G'→R' are illustrated on FIG. 51. Let us now investigate conflict free partial solutions. Applying the criterion through visual observation of previous figures yields:

$$L_1 \cap L'_1 = G_1 \cap G'_1 = \{a\}$$

$$L_1 \cap L'_2 = G_1 \cap G'_2 = \phi \text{ and } \{g,h,(g,h)\} = L_2 \cap L'_2 \neq G_2 \cap G'_2 = \{h\}.$$

$$L_2 \cap L'_1 = G_2 \cap G'_1 = \phi$$

This proves that only $L_2←G_2→R_2$ and $L'_2←G'_2→R'_2$ are not compatible. Consequently, only two conflict free partial solutions are set up. The first one is obtained by applying L←G→R and $L'_1←G'_1→R'_1$ to the initial graph A (sequence order has no influence), which yields graph $\tilde{B}_1$. The second one is obtained by applying $L_1←G_1→R_1$ and L'←G'→R' to the initial graph A (one more, sequence order has no influence) which yields graph $\tilde{B}_2$. FIGS. 52-54 show the conflict free partial solutions $\tilde{B}_1$ and $\tilde{B}_2$ together with and the conflict solution $\tilde{B}$. Choosing between $\tilde{B}_1$ and $\tilde{B}_2$ (or even $\tilde{B}$) is the designer's decision. The value of the invention is to help this decision with the best possible suggestions.

As can be seen from the explanations above, only the logical aspect of the product is taken into account by the invention, as opposed to three dimensional or geometrical aspects. This means that the merge of the two modeled objects is performed very quickly. Besides, the invention deals with the following problems:

Merging independently modified models into a single model.
Raising conflicts (if any).
Suggesting conflict free partial solutions.

The above method is computer-implemented, which means that the steps of the method are executed by a computer. However, the triggering of at least some of the steps of the method may be performed through user-computer interaction, as has been significantly described. The level of user-computer interaction required may depend on the level of automatism foreseen and put in balance with the need to implement the user's desideratum. In embodiments, this level may be user-defined and/or pre-defined.

Thus, the invention is also directed to a CAD system suitable for performing the method. In practice, a user is provided with a graphical user interface (or GUI) such as the one of CATIA, the GUI being in relation with a means, e.g. a database, for storing data necessary to the execution of the method. This GUI is coupled with a processor and with a memory suitable for storing the first modeled object, the second modeled object, the initial modeled object, the first graph (B) and the second graph (B') defining respectively the first and second modeled objects and all other data if any necessary for the functioning of the method. Such a system allows an improved collaboration design. Indeed, in all situations the system provides a quick merge of two modeled objects.

Figure 55:
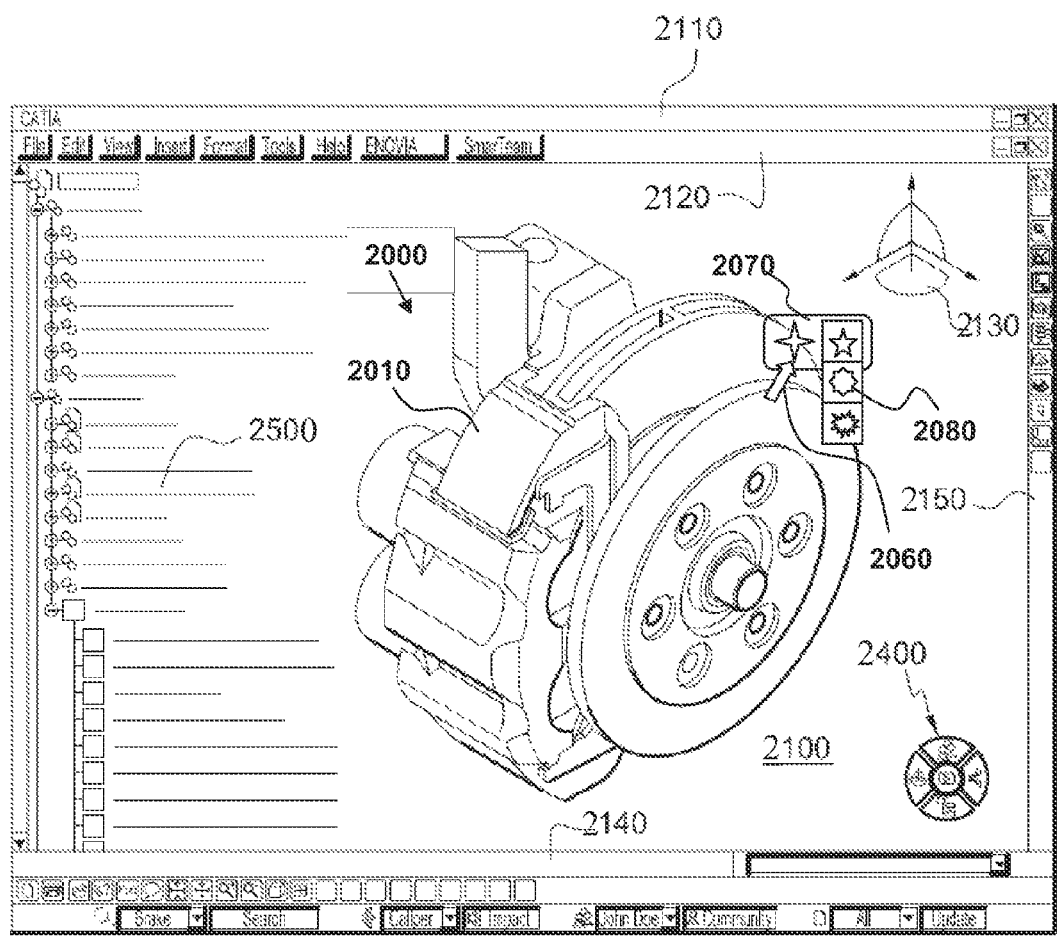
FIG. 55 shows an exemplified graphical user interface.

In reference to FIG. 55, the exemplified graphical user interface (or GUI) 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art.

Some of these icons are associated with software tools, adapted for editing and/or working on the 3D object which is a modeled product 2000 or parts of product 2000 such as that displayed in the GUI 2100. In the following description, "product", "part", "assembly" and the like may be referred to as "part" for the sake of simplicity. Note that the concept The concept of "part" can in fact be generalized to that of "object", wherein an object can be only a "physical" part of the designed product or, more generally, any software tool participating in the design process (but not necessarily "in" the final product).

The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of a 3D modeled object displayed on the screen.

The GUI may for example display data 2500 related to the displayed product 2000. In the example of FIG. 55, the data 2500, displayed as a "feature tree", and their 3D representation 2000 pertain to a brake assembly including brake caliper and disc 2010. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

It is to be understood that the part 2000 can be any object in any configuration capable of being defined by a CAD/CAM/CAE system, or any system used to display views of an object from varying viewpoints. The invention may thus be implemented on a computer program comprising instructions by a computer, the instructions comprising means for causing the above system to perform the above method. Such a program thus allows updating current systems for allowing an improved collaborative design. The invention may for example be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Figure 56:
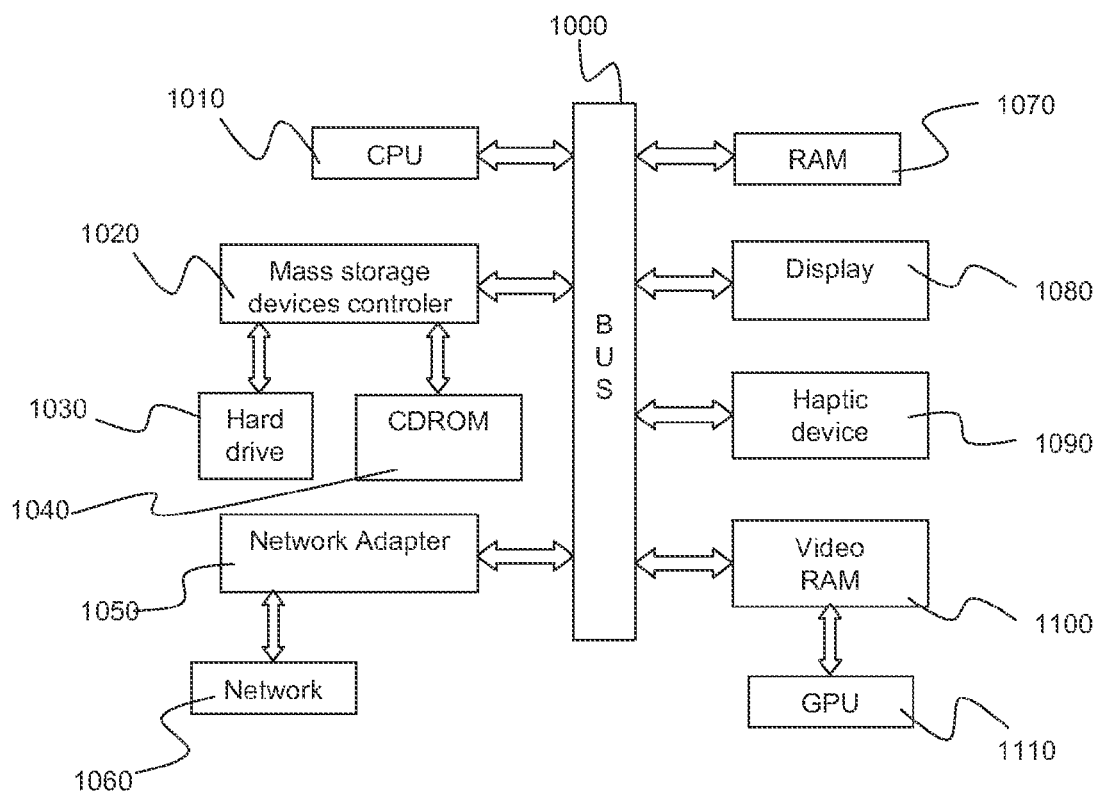
FIG. 56 shows an exemplified computer system.

FIG. 56 shows a client computer system, e.g. a workstation of a user.

The client computer comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080, as mentioned with reference to FIG. 55. In addition, the cursor control device allows the user to select various commands, and input control signals. The cursor control device includes a number of signal generation devices for input control signals to system. Typically, a cursor control device may be a mouse, the button of the mouse being used to generate the signals.

The invention claimed is:

1. A computer-implemented method of collaborative design for merging a first modeled object with a second modeled object wherein the first and second modeled objects are modified copies of an initial modeled object, wherein the first modeled object, the second modeled object and the initial modeled object are CAD three-dimensional modeled objects defined respectively by an initial graph (A), a first graph (B) and a second graph (B'), wherein the initial graph (A), the first graph (B) and the second graph (B') are boundary representation graphs or history graphs, wherein the method comprises:
   providing the initial modeled object;
   providing a respective copy of the initial modeled object to each of a first user and a second user,
   with at least one processor:
   performing, by the first user, a design modification on the copy of the initial modeled object respective to the first user, thereby providing the first modeled object,
   performing, by the second user, a design modification on the copy of the initial modeled object respective to the second user, the design modification performed by the second user being different from the design modification performed by the first user, thereby providing the second modeled object,
   computing a first double push-out graph rewriting rule and a second double push-out graph rewriting rule, the first double push-out graph rewriting rule and the second double push-out graph rewriting rule corresponding respectively to a transformation of the initial graph (A) into the first graph (B) and the second graph (B'),
      wherein the first double push-out graph rewriting rule specifies a first part (L) from the initial graph (A) which is to be replaced when transforming the initial graph (A) into the first graph (B), a first replacement (R) to replace the first part (L), a first interface (G) between the first part (L) and the first replacement (R), first morphisms from the first interface (G) to the first part (L) and to the first replacement (R) respectively, and
      wherein the second double push-out graph rewriting rule specifies a second part (L') from the initial graph (A) which is to be replaced when transforming the initial graph (A) into the second graph (B'), a second replacement (R') to replace the second part (L'), a second interface (G') between the second part (L') and the second replacement (R'), second morphisms from the second interface (G') to the second part (L') and to the second replacement (R') respectively;
   assembling the first rewriting rule and the second rewriting rule to determine and provide a third double push-out graph rewriting rule,
      wherein the third double push-out graph rewriting rule specifies an assembled part ($\tilde{L}$) which is an assembly of the first part (L) and the second part (L'), an assembled replacement ($\tilde{R}$) which is an assembly of the first replacement (R) and the second replacement (R'), an assembled interface ($\tilde{G}$) which is an assembly of the first interface (G) and the second interface (G'), assembled morphisms from the assembled interface ($\tilde{G}$) to the assembled part ($\tilde{L}$) and the assembled replacement ($\tilde{R}$) respectively, wherein an assembly of elements of the first and second rewriting rules consists, for each element, of a gathering of constituents of the element of the first rewriting rule with constituents of the element of the second rewriting rule;
   computing a merged graph ($\tilde{A}$) by applying the third double push-out graph rewriting rule to the initial graph (A), wherein the merged graph is translated in a merged modeled object.

2. The method of claim 1, wherein the computing of a first double push-out graph rewriting rule and a second double push-out graph rewriting rule comprises:
  determining:
    a first common part between the initial graph and the first graph, and
    a second common part between the initial graph and the second graph
  determining:
    a first subtraction between the first graph and the first common part,
    a second subtraction between the second graph and the second common part,
    a third subtraction between the initial graph and the first common part, and
    a fourth subtraction between the initial graph and the second common part,
  determining:
    first end nodes which are nodes of the first common part missing from arcs of the first subtraction,
    second end nodes which are nodes of the second common part missing from arcs of the second subtraction,
    third end nodes which are nodes of the first common part missing from arcs of the third subtraction, and
    fourth end nodes which are nodes of the second common part missing from arcs of the fourth subtraction
  computing:
    the first interface as a union between the first end nodes and the third end nodes,
    the second interface as a union between the second end nodes and the fourth end nodes,
    the first part as a union between the first interface, the third subtraction, and the third end nodes,
    the second part as a union between the second interface, the fourth subtraction, and the fourth end nodes,
    the first replacement as a union between the first interface, the first subtraction, and the first end nodes, and
    the second replacement as a union between the second interface, the second subtraction, and the second end nodes.

3. The method of claim 1, wherein applying the third double push-out graph rewriting rule to the initial graph consists of replacing in the initial graph the assembled part by the assembled replacement.

4. The method of claim 1, wherein the determining of the third double push-out graph rewriting rule is performed according to a prior evaluation of compatibility between the first rewriting rule and the second rewriting rule.

5. The method of claim 4, wherein the evaluation of compatibility comprises comparing a part intersection between the first part and the second part to an interface intersection between the first interface and the second interface, the evaluation being negative when the part intersection is not equal to the interface intersection.

6. The method of claim 4, wherein the evaluation of compatibility is negative, and the determining of the third rewriting rule is performed via user interaction.

7. The method of claim 6, wherein the determining of the third double push-out graph rewriting rule comprises:
  decomposing:
    the first double push-out graph rewriting rule into first connected components, wherein each first connected component gathers elements of the first part, the first interface and the first replacement, which are all connected through the first morphisms,
    the second double push-out graph rewriting rule into second connected components, wherein each second connected component gathers elements of the second part, the second interface and the second replacement, which are all connected through the second morphisms;
  computing maximal cliques comprised of a first set of first connected components and a second set of second connected components, wherein the intersection between elements of the first set coming from the first part and elements of the second set coming from the second part is equal to the intersection between elements of the first set coming from the first interface and elements of the second set coming from the second interface; and
  allowing for user selection of at least one of the cliques, the selected clique constituting the third rewriting rule.

8. The method of claim 7, wherein the method further comprises, after the user selection of a clique, highlighting on the initial modeled object the elements of the selected clique coming from the first part and from the second part, and obtaining a confirmation by the user of the selected clique.

9. The method of claim 1, wherein the first modeled object, the second modeled object and the initial modeled object are three-dimensional modeled objects.

10. The method of claim 1, wherein the merged modeled object is displayed.

11. The method of claim 1, wherein the first modeled object is provided by a first user performing a first design modification on the initial modeled object, and the second modeled object is provided by a second user performing a second design modification on the initial modeled object which is different from the first design modification.

12. A computer-aided collaborative design system configured to merge a first modeled object with a second modeled object wherein the first and second modeled objects are modified copies of an initial modeled object, wherein the first modeled object, the second modeled object and the initial modeled object are CAD three-dimensional modeled objects defined respectively by an initial graph (A), a first graph (B) and a second graph (B'), wherein the initial graph (A), the first graph (B) and the second graph (B') are boundary representation graphs or history graphs, comprising:
  a memory suitable for storing the first modeled object, the second modeled object, and the initial modeled object, wherein the first modeled object is a first modification, by a first user, of the initial modeled object, and second modeled object is a second modification, by a second user, of the initial modeled object, a first graph and a second graph defining respectively the first and second modeled objects, and
  a graphical user interface coupled with a processor and the memory, the graphical user interface and processor configured to merge the first and second graph by:
    computing a first double push-out graph rewriting rule and a second double push-out graph rewriting rule, the first rewriting rule and the second rewriting rule corresponding respectively to a transformation of the initial graph (A) into the first graph (B) and the second graph (B'),
      wherein the first double push-out graph rewriting rule specifies a first part (L) from the initial graph (A) which is to be replaced when transforming the initial graph (A) into the first graph (B), a first replacement (R) to replace the first part (L), a first interface (G) between the first part (L) and the first replacement (R), first morphisms from the first interface (G) to the first part (L) and to the first replacement (R) respectively, and wherein the second double push-out graph rewriting rule specifies a second part (L') from the initial graph (A) which is to be replaced when transforming the initial graph (A) into the second graph (B'), a second replacement (R') to replace the second part (L'), a second interface (G') between the second part (L') and the second replacement (R'), second morphisms from the second interface (G') to the second part (L') and to the second replacement (R') respectively;

assembling the first rewriting rule and the second rewriting rule to determine and provide a third double push-out graph rewriting rule, wherein the third double push-out graph rewriting rule specifies an assembled part ($\tilde{L}$) which is an assembly of the first part (L) and the second part (L'), an assembled replacement ($\tilde{R}$) which is an assembly of the first replacement (R) and the second replacement (R'), an assembled interface ($\tilde{G}$) which is an assembly of the first interface (G) and the second interface (G'), assembled morphisms from the assembled interface ($\tilde{G}$) to the assembled part ($\tilde{L}$) and the assembled replacement ($\tilde{R}$) respectively, wherein an assembly of elements of the first and second rewriting rules consists, for each element, of a gathering of constituents of the element of the first rewriting rule with constituents of the element of the second rewriting rule;

computing a merged graph ($\tilde{A}$) by applying the third double push-out graph rewriting rule to the initial graph (A), wherein the merged graph is translated in a merged modeled object.

13. A non-transitory computer readable storage medium having recorded thereon computer program code instructions for execution by a computer, the instructions comprising a method of collaborative design for merging a first modeled object with a second modeled object wherein the first and second modeled objects are modified copies of an initial modeled object, wherein the first modeled object, the second modeled object and the initial modeled object are CAD three-dimensional modeled objects defined respectively by an initial graph (A), a first graph (B) and a second graph (B'), wherein the initial graph (A), the first graph (B) and the second graph (B') are boundary representation graphs or history graphs, wherein the method comprises:

receiving the first modeled object resulting from a first design modification performed on a first copy of the initial modeled object by the first user, receiving the second modeled object resulting from a second design modification performed on a second copy of the initial modeled object by the second user, computing a first double push-out graph rewriting rule and a second double push-out graph rewriting rule, the first rewriting rule and the second rewriting rule corresponding respectively to a transformation of an initial graph (A) into the first graph (B) and the second graph (B'), wherein the first double push-out graph rewriting rule specifies a first part (L) from the initial graph (A) which is to be replaced when transforming the initial graph (A) into the first graph (B), a first replacement (R) to replace the first part (L), a first interface (G) between the first part (L) and the first replacement (R), first morphisms from the first interface (G) to the first part (L) and to the first replacement (R) respectively, and wherein the second double push-out graph rewriting rule specifies a second part (L') from the initial graph (A') which is to be replaced when transforming the initial graph (A) into the second graph (B'), a second replacement (R') to replace the second part (L'), a second interface (G') between the second part (L') and the second replacement (R'), second morphisms from the second interface (G') to the second part (L') and to the second replacement (R') respectively;

assembling the first rewriting rule and the second rewriting rule to determine and provide a third double push-out graph rewriting rule, wherein the third double push-out graph rewriting rule specifies an assembled part ($\tilde{L}$) which is an assembly of the first part (L) and the second part (L'), an assembled replacement which is an assembly of the first replacement (R) and the second replacement ($\tilde{R}$), an assembled interface ($\tilde{G}$) which is an assembly of the first interface (G) and the second interface (G'), assembled morphisms from the assembled interface ($\tilde{G}$) to the assembled part ($\tilde{L}$) and the assembled replacement ($\tilde{R}$) respectively;

computing a merged graph ($\tilde{A}$) by applying the third double push-out graph rewriting rule to the initial graph (A), wherein the merged graph is translated in a merged modeled object.

\* \* \* \* \*